(12) United States Patent
Lutnick et al.

(10) Patent No.: US 8,751,362 B1
(45) Date of Patent: Jun. 10, 2014

(54) PRODUCTS AND PROCESSES FOR GENERATING A PLURALITY OF ORDERS

(75) Inventors: Howard W. Lutnick, New York, NY (US); Lawrence Tint, New York, NY (US)

(73) Assignee: CFPH, LLC, New York, NY (US)

( * ) Notice: Subject to any disclaimer, the term of this patent is extended or adjusted under 35 U.S.C. 154(b) by 439 days.

(21) Appl. No.: 12/477,549

(22) Filed: Jun. 3, 2009

Related U.S. Application Data

(63) Continuation of application No. 12/470,431, filed on May 21, 2009, now abandoned, which is a continuation-in-part of application No. 12/135,479, filed on Jun. 9, 2008, and a continuation-in-part of application No. 12/113,602, filed on May 1, 2008, now Pat. No. 8,082,205, and a continuation-in-part of application No. 12/237,976, filed on Sep. 25, 2008.

(51) Int. Cl.
*G06Q 40/00* (2012.01)
*G06Q 40/04* (2012.01)

(52) U.S. Cl.
CPC .................................. *G06Q 40/04* (2013.01)
USPC .......................................................... 705/37

(58) Field of Classification Search
USPC ..................................................... 705/35–45
See application file for complete search history.

(56) References Cited

U.S. PATENT DOCUMENTS

| | | |
|---|---|---|
| 5,950,177 A | 9/1999 | Lupien et al. |
| 5,963,923 A | 10/1999 | Garber |
| 6,098,051 A | 8/2000 | Lupien et al. |
| 6,134,535 A | 10/2000 | Belzberg |
| 6,282,521 B1 | 8/2001 | Howorka |
| 6,343,278 B1 | 1/2002 | Jain et al. |
| 6,377,940 B2 * | 4/2002 | Tilfors et al. ................... 705/37 |
| 6,938,011 B1 | 8/2005 | Kemp et al. |
| 6,952,683 B1 | 10/2005 | Gerhard |
| 7,047,218 B1 | 5/2006 | Wallman |
| 7,127,424 B2 | 10/2006 | Kemp, II et al. |
| 7,136,834 B1 | 11/2006 | Merrin et al. |
| 7,155,410 B1 | 12/2006 | Woodmansey et al. |
| 7,308,428 B1 | 12/2007 | Federspiel |
| 7,356,500 B1 | 4/2008 | Waelbroeck |
| 7,392,214 B1 * | 6/2008 | Fraser et al. ................... 705/37 |
| 7,428,506 B2 | 9/2008 | Waelbroeck |
| 7,533,052 B2 | 5/2009 | Tilfors et al. |
| 7,565,313 B2 | 7/2009 | Waelbroeck |
| 7,680,715 B2 | 3/2010 | Waelbroeck |
| 7,685,052 B2 | 3/2010 | Waelbroeck |
| 7,747,515 B1 | 6/2010 | Merrin et al. |
| 7,778,919 B2 | 8/2010 | Waelbroeck |

(Continued)

FOREIGN PATENT DOCUMENTS

| | | |
|---|---|---|
| JP | H11-504455 | 4/1999 |
| JP | 2004-46884 | 2/2004 |

(Continued)

OTHER PUBLICATIONS

US PTO Office action for U.S. Appl. No. 12/477,523; Sep. 22, 2011; 6 pages.

(Continued)

*Primary Examiner* — Stephanie M Ziegle

(57) ABSTRACT

A trading platform and trading method that permit calculation of a price is described. Other embodiments are also described.

47 Claims, 18 Drawing Sheets

(56) References Cited

U.S. PATENT DOCUMENTS

| | | | |
|---|---|---|---|
| 7,814,000 B2 | 10/2010 | Waelbroeck | |
| 7,827,089 B2 * | 11/2010 | Sweeting et al. | 705/37 |
| 7,865,425 B2 | 1/2011 | Waelbroeck | |
| 7,870,059 B2 | 1/2011 | Waelbroeck | |
| 7,870,062 B2 | 1/2011 | Waelbroeck | |
| 7,877,318 B2 | 1/2011 | Waelbroeck | |
| 7,882,013 B2 | 2/2011 | Shapiro | |
| 7,882,014 B2 | 2/2011 | Shapiro | |
| 7,882,015 B2 | 2/2011 | Waelbroeck | |
| 7,904,376 B2 | 3/2011 | Shapiro | |
| 7,908,203 B2 | 3/2011 | Shapiro | |
| 7,908,205 B2 | 3/2011 | Waelbroeck | |
| 7,908,206 B2 | 3/2011 | Waelbroeck | |
| 7,917,425 B2 | 3/2011 | Waelbroeck | |
| 7,996,261 B1 | 8/2011 | Waelbroeck | |
| 8,010,438 B2 | 8/2011 | Waelbroeck | |
| 8,024,253 B2 | 9/2011 | Petterffy et al. | |
| 8,041,628 B2 | 10/2011 | Waelbroeck | |
| 8,069,106 B2 | 11/2011 | Waelbroeck | |
| 8,095,455 B2 | 1/2012 | Shapiro | |
| 8,095,456 B2 | 1/2012 | Waelbroeck et al. | |
| 8,103,579 B1 | 1/2012 | Berkeley | |
| 8,108,299 B1 | 1/2012 | Waelbroeck | |
| 2002/0095364 A1 | 7/2002 | Russell et al. | |
| 2002/0099642 A1 | 7/2002 | Schwankl et al. | |
| 2002/0143689 A1 | 10/2002 | Naylor et al. | |
| 2002/0169703 A1 * | 11/2002 | Lutnick et al. | 705/37 |
| 2003/0154157 A1 | 8/2003 | Kokis et al. | |
| 2004/0034591 A1 | 2/2004 | Waelbroeck et al. | |
| 2004/0143539 A1 | 7/2004 | Penney et al. | |
| 2004/0177025 A1 | 9/2004 | Spoonhower et al. | |
| 2004/0215549 A1 | 10/2004 | Madhaven et al. | |
| 2005/0027638 A1 | 2/2005 | Ng et al. | |
| 2005/0187854 A1 | 8/2005 | Cutler et al. | |
| 2006/0229970 A1 | 10/2006 | Anderson et al. | |
| 2006/0259414 A1 | 11/2006 | Singer et al. | |
| 2008/0262957 A1 | 10/2008 | Ford | |
| 2009/0018945 A1 | 1/2009 | Ford | |
| 2009/0089199 A1 | 4/2009 | Waelbroeck | |
| 2009/0094151 A1 | 4/2009 | Mortimer | |
| 2009/0259584 A1 | 10/2009 | Waelbroeck | |
| 2010/0017323 A1 | 1/2010 | Zimmerman | |
| 2010/0094775 A1 | 4/2010 | Waelbroeck | |
| 2010/0121759 A1 | 5/2010 | Waelbroeck | |
| 2012/0011051 A1 | 1/2012 | Waelbroeck | |

FOREIGN PATENT DOCUMENTS

| | | |
|---|---|---|
| JP | 2004-537769 | 12/2004 |
| WO | WO 96/34357 | 10/1996 |
| WO | WO 02/29686 | 4/2002 |
| WO | WO 02/093326 | 11/2002 |

OTHER PUBLICATIONS

USPTO Office action for U.S. Appl. No. 12/477,523; Jun. 4, 2012; 9 pages.

JP Office Action for Application No. 2008-512581 dated Nov. 8, 2011; 4 pages (including English Translation).

AU Examination Report for Application No. 2006251674 dated Feb. 9, 2011; 2 pages.

EP Extended Search Report for Application No. 06760245.8 dated Oct. 30, 2009; 7 pages.

Search Report and Written Opinion for PCT.US06/19640; 6 pages; Nov. 13, 2007.

US PTO Office Action for U.S. Appl. No. 13/234,147; Oct. 1, 2012; 9 pages.

US PTO Office Action for U.S. Appl. No. 11/133,767; Apr. 17, 2012; 30 pages.

US PTO Office Action for U.S. Appl. No. 11/133,767; Oct. 9, 2008; 16 pages.

US PTO Office Action for U.S. Appl. No. 11/133,767; Mar. 14, 2011; 24 pages.

US PTO Office Action for U.S. Appl. No. 11/133,767; Aug. 13, 2009; 18 pages.

US PTO Office Action for U.S. Appl. No. 11/133,767; Jun. 23, 2010; 20 pages.

EP Examination Report for Application No. 06760245.8 dated Feb. 13, 2002; 4 pages.

JP Office Action for Application No. 2008-512581 dated Sep. 19, 2012; 6 pages (including English Translation).

\* cited by examiner

| 410 | 412 | 414 | 416 | 418 | 420 | 422 | 424 | 426 | 428 | 430 |
|---|---|---|---|---|---|---|---|---|---|---|
| ORDER ID | TRADER ID | ORDER STATUS | ORDER LAST UPDATE TIME | TRANSACTION TYPE | SECURITY SYMBOL | SECURITY TYPE | ORDER TYPE | LIMIT PRICE | TOTAL ORDER SIZE | QUANTITY PLACED ELSEWHERE |

PRODUCTS AND PROCESSES FOR GENERATING A PLURALITY OF ORDERS

The present application is a continuation of U.S. patent application Ser. No. 12/470,431, filed May 21, 2009 now abandoned; which is a continuation in part of each of the following applications: U.S. patent application Ser. No. 12/135,479, entitled "TRADING SYSTEM PRODUCTS AND PROCESSES", filed Jun. 9, 2008 now U.S. Pat. No. 8,082,205; U.S. patent application Ser. No. 12/113,602, filed May 1, 2008, entitled "ELECTRONIC SECURITIES MARKETPLACE HAVING INTEGRATION WITH ORDER MANAGEMENT SYSTEMS"; and U.S. patent application Ser. No. 12/237,976, filed Sep. 25, 2008, entitled "TRADING RELATED TO FUND COMPOSITIONS".

Each of the above applications is incorporated by reference herein as part of the present disclosure.

BRIEF DESCRIPTION OF THE DRAWINGS

FIG. 14 is a diagram illustrating a data record stored in the order management system (OMS) database to identify an order according to an embodiment;

DETAILED DESCRIPTION

Figure 1:
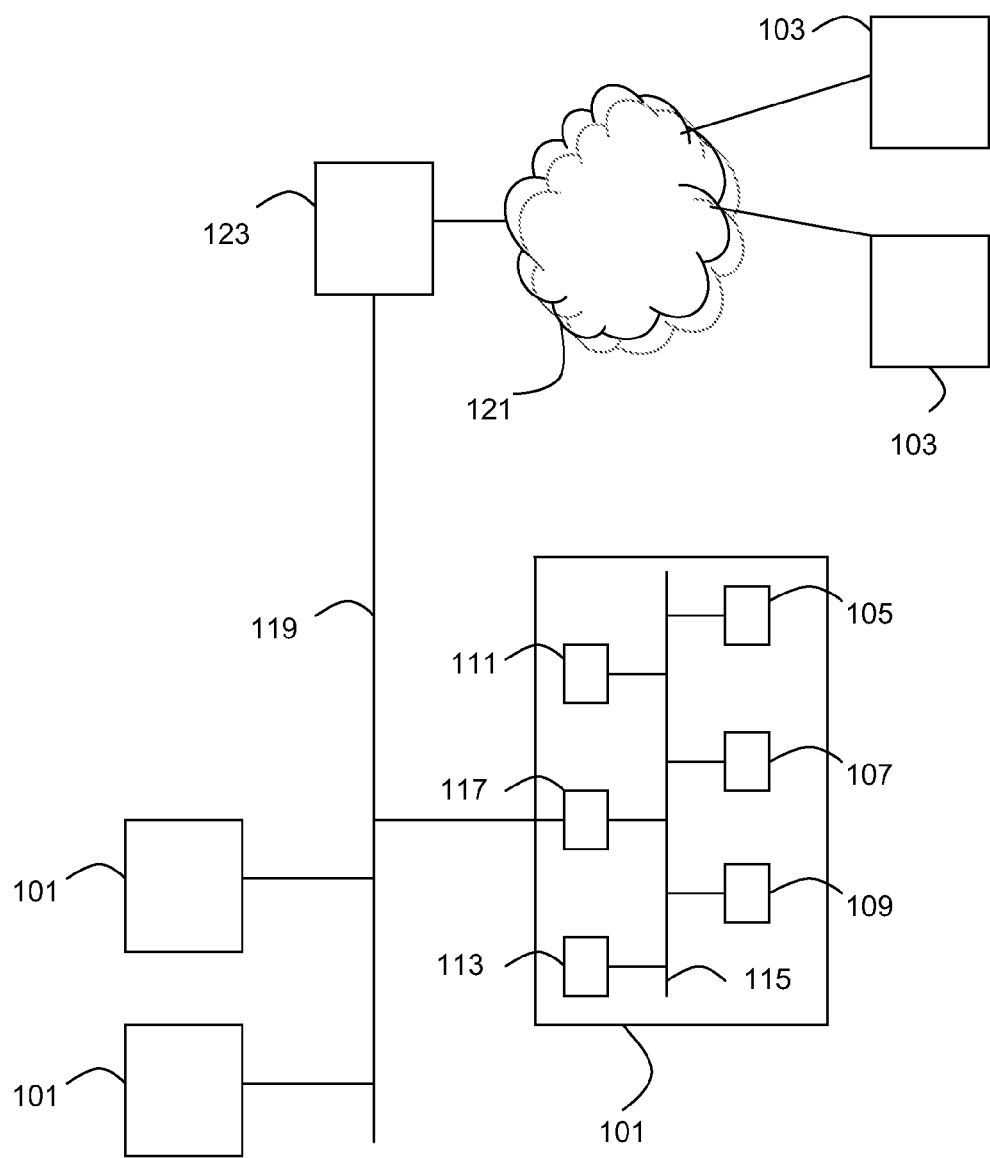
FIG. 1 illustrates an embodiment of a computer system according to an embodiment.

The following sections provide a guide to interpreting the present application.

I. Terms

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The term "variation" of an invention means an embodiment of the invention, unless expressly specified otherwise.

The term "herein" means "in the present application, including anything which may be incorporated by reference", unless expressly specified otherwise.

The terms "including", "comprising" and variations thereof mean "including but not limited to", unless expressly specified otherwise.

The terms "a", "an" and "the" mean "one or more", unless expressly specified otherwise.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "plurality" means "two or more", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

The term "facilitating" and like terms may include any action or set of actions which help to bring about a result. Throughout this disclosure, examples of facilitation may be given. Such examples should be interpreted as non-limiting examples only.

An order query should be understood to include information that, when interpreted by a computer module, identifies an order for which a trade related action is desired. Such information may be interpreted by the computer module for use in querying stored information such as a database of stored order information.

A computer modules should be understood to include any combination of hardware and/or software.

A firm order should be understood to include an order for a financial instrument, for which a system will execute a trade with a matching order without additional intervening authorization from an originator of the firm order.

A financial instrument should be understood to include an instrument that evinces ownership of dept or equity, and/or any derivative thereof, including equities, stocks, fixed income instruments, bonds, debentures, certificates of interest or deposit, warrants, options, futures, forwards, swaps, or generally any security.

Although some embodiments are described with reference to Order Management Systems, which are understood in the art, it should be understood that other embodiments may include an order information system. An order information system should be understood any system through which information about orders to purchase and/or sell financial instruments is stored, including, for example, order management systems.

Two things should be understood to match if they share one or more properties. The exact properties shared may be different among various embodiments. Some example properties may include, a type of financial instrument (e.g., industry, capitalization, risk, etc.), a security identifier (e.g., stock symbol, etc.), an amount of shares, a price, etc.

A representation of a thing includes any indication from which a part of an underlying thing may be derived.

Binding acceptance of an order should be understood to include an acceptance of a trade fulfilling at least part of the order that does not allow for further intervention in the execution of the trade and without the ability to revoke the acceptance (e.g., without the ability to revoke the acceptance in any way, without the ability to revoke the acceptance without a penalty).

Suppressing evidence should be understood to include attempting to prevent others from discovering evidence. Suppressing evidence of a situation or action may include not disseminating information about the situation or action, disseminating false or misleading information about the situation or action, disseminating false or mislead information at other times to obscure the dissemination of information about the situation or action, and/or any other desired actions.

Facilitating execution of a trade should be understood to include performing any actions that help to bring about the execution of a trade. The actions may include, for example, actually executing the trade, transmitting a request for the execution of the trade, transmitting any information that helps to bring about the trade, and/or any other actions.

A marketplace should be understood to include a platform through which at least the following actions are performed: order execution is facilitated, indications of orders are accepted, and matches for the orders are sought.

A trade should be understood to fulfill part of an order for one or more things if the trade includes transfers of ownership of at least a portion of the one of more thing in accordance with the order.

A participant system should be understood to include any system that allows an order management system to interface with a marketplace.

Applying a filter to a set of things should be understood to include generating a subset of the set of things in which each thing in the subset has one or more desired properties.

Enabling should be understood to include allowing an action to occur. An action may be enabled by, for example, providing/activating a mechanism (e.g., a button or other control) through which the action may be performed (e.g., by clicking a button or otherwise activating another control).

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. One or more such computers or computing devices may be referred to as a computer system. FIG. 1 illustrates an example computer system. The computer system comprises a plurality of server computers 101 and client computers 103. Typically a processor 105 (e.g., one or more microprocessors, one or more microcontrollers, one or more digital signal processors) will receive instructions (e.g., from a memory 107 or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 109 and other persistent memory. Volatile media include dynamic random access memory (DRAM) 111, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

A computer system may also include one or more input/output devices 113. Such input/output devices may include monitors, keyboards, mice, and r any other desired devices.

Some computer systems may include transmission medium 115, which may be referred to as a communication network, that couples various internal components of the computer system. Such a communication network may also be referred to in some implementations as a computer bus. Some computer systems may include a specialized input/output device 117 configured to connect to an external communication network. Such a device may be referred to as a network interface. The external communication network may include a LAN 119 and/or the Internet 121. In some implementations, an edge routing device 123 may operate between a LAN and another network like the Internet 121. Such a device may include a firewall and/or any other desired security mechanism.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein.

Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium®, Core, or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Some Sample Embodiments in an embodiment, information about orders for goods or services may be tracked by an order management system (OMS). An order management system may include data regarding desired, contemplated, open, completed, considered, ongoing and/or other order. One type of order management system used in securities trading includes the Fidessa Order Management System. Although this order management system and embodiments herein focus generally on the trading of securities (e.g., stocks, bonds, futures, options, derivatives, etc.), it should be recognized that other embodiments may be used in connection with the trading of any goods and/or services whether tangible (e.g., food, oil, collectibles, etc.) or intangible (intellectual property rights, contract performance, etc.).

Information that is stored by an OMS may identify a specific security that is desired (e.g., by a user of the OMS, by a client of the user of the OMS, etc.), a type or class of security that is desired, an amount or range of amounts of a security that is desired, a desired price, price range, and/or pricing method to be used to buy the security, a limit on a desired price associated with a limit order for the security, a security to be sold, a price, price range, and/or pricing method to be used to sell a security, a security desired or available to be sold (e.g., long and/or short sale), an amount of a security to be sold, contingent buying and/or selling information (e.g., information identifying a purchase to be made if some contingent event occurs, information setting amounts based on a contingent price, etc.), and/or any other information.

Pricing policies may include any desired pricing policy supported by a trading system. In some embodiments, such a pricing policy may include, for example, midpoint pricing in which prices are based on a midpoint between a national best offer and national best bid, limit pricing in which a maximum or minimum price level cannot be passed, midpoint pricing subject to such a limit, volume weighted average pricing in which the weighted average price over a trading period is the bases of the price. Any other methods or combinations of pricing policies may be used.

Market liquidity, a measure a securities ability to be bought and/or sold readily through a market, is recognized as a factor that may affect prices at which securities are traded. For example, one may have a more difficult time selling an illiquid security because potential buyers may fear they will be unable to resell the security after purchase. Such fear may artificially lower the price of the sale of the security from the true market value of the security to help alleviate the fears of such potential buyers.

Accordingly, a more liquid market may facilitate trading of securities at their fair market values or closer to their fair market values than they would be traded at in a less liquid market.

In some markets, information identifying orders (e.g., bids, offers, etc.) that is stored by order management systems, or otherwise stored internally by a trading organization or trader, have not traditionally been thought of as liquidity available to the market. Rather, such orders typically add to the liquidity of those markets only when they are made public to the market so other traders in the market may act against those orders. Such secret orders may be referred to as "dark pools" or "dark books" of liquidity because they remain unseen by such markets.

It is recognized that enabling trading to take place using such orders may improve the liquidity of a market and thereby allow more trades to occur through a market and/or allow trades to occur at a price closer to or at a fair market value.

It is recognized that one problem that may be associated with using such orders in a market includes a potential that information associated with the existence of otherwise secret orders may be used to influence a market and/or to diminish an advantage attributable to the originator of the information (e.g., some insight, knowledge, trading algorithm, etc.). In typical markets, when bids and offers match, a negotiation may take place between a buyer and a seller before any transaction is finalized. Such negotiations typically include revealing the existence of a matching party, information about a matching order associated with the matching party, and/or the identity of the matching party to both parties involved in the negotiation. By revealing this information, the potential to "game the market" (e.g., artificially affect a market using knowledge of the existence of orders of other people) is increased and the possibly secret knowledge embodied by the orders may be made public. For example, a trader may end a negotiation by refusing an order in a negotiation. The trader may subsequently use the knowledge that the matching party is interested in a transaction related to the security to increase or decrease the price of the security by entering one or more other orders at higher or lower prices and/or use the knowledge embodied by the order to adjust otherwise adjust a trading strategy.

It is recognized that as the size of orders increases, the chances that a trader associated with such orders is trying to game the market may decrease. Accordingly, it is recognized that trading large blocks of liquidity may decrease the probability that gaming is occurring. It is also recognized that if a trader agrees to have an order executed without a negotiation, without receiving notification before the execution, and/or otherwise automatically, the chance that the trader is trying to game the market is also decrease. Furthermore, it is recognized that if anonymity of trading partners is maintained for part or all of a trading exchange, the chances of gaming the market are also reduced. Accordingly, participants in securities markets, such as buy and/or sell side participants) may be more willing to participate in markets with one or more such characteristics. Further, such participants may be more willing to allow orders present in OMS to add liquidity to such markets. Markets with such characteristics may, for example, allow large blocks of securities to be moved relatively quietly compared to traditional trading mechanisms.

It is recognized that in some markets, such as typical securities markets, participants exist in an asymmetrical relationship. For example, participants known as sell side firms in securities markets generally act as retail brokers and researchers for investors. Participants known as buy side firms in securities markets generally include investment institutions that tend to buy and/or sell large amounts of securities for money-management purposes and keep information about their trading intentions secret. Accordingly, the desires of these participants may not be identical. Some embodiments may be configured to treat differently participants with different characteristics in an attempt to balance desires of the different participants.

Some embodiments of a trading system may allow access to what might be traditionally untapped pools of liquidity (e.g., orders in OMS systems). Such systems may provide asymmetric access rules to such information to accommodate desires and/or preferences of market participants. Such systems may include anonymity policies, order size restrictions, incentives, filtering policies, and/or automatic execution of types of orders to encourage participation.

Some embodiments may read information from an OMS or other source of orders associated with a buy side market participant. Information regarding such orders may be used to match information from other market participants with one or more element of anonymity, automatic order execution, and/or order size policy implementations. In some embodiments, the information may be narrowcast to potential counter parties for matching with orders associated with the OMS of those parties. Accordingly, market participants, such as sell side participants and buy side participants can submit orders, both firm orders and OMS orders that add liquidity to a market, with a degree of privacy and/or a security that the market is not being gamed by other participants.

In some embodiments, firm orders (i.e., orders for which participants agree to automatic order execution with matching orders) may be viewed anonymously by those unlikely to abuse the information, and/or by nobody at all. In some implementations, such participants may include buy side participants who may view information about firm orders if a matching order exists in an OMS associated with a respective buy side participant. In some implementations, such participants may include participants for which matching firm orders exist (e.g., have been submitted to a trading system). By limiting the viewing of such information, trading of high quality block liquidity using pools of liquidity currently not available may be encouraged.

In some embodiments, control over one or more aspects of disclosing information about orders in an OMS may reside with buy side originators of the orders. In some embodiments, sell side participants or other buy side participants that enter a firm order matching an order in a buy side participant's OMS may only be notified of the existence of such a matching order if the buy side participant with the order in its OMS agrees to such notification, and/or agrees to an execution of a trade. In some embodiments, the sell side participants or other buy side participants may not be notified of the identity of the buy side participant at all, but rather only be notified that some matching order was found and/or executed.

Example Structures

Figure 2:
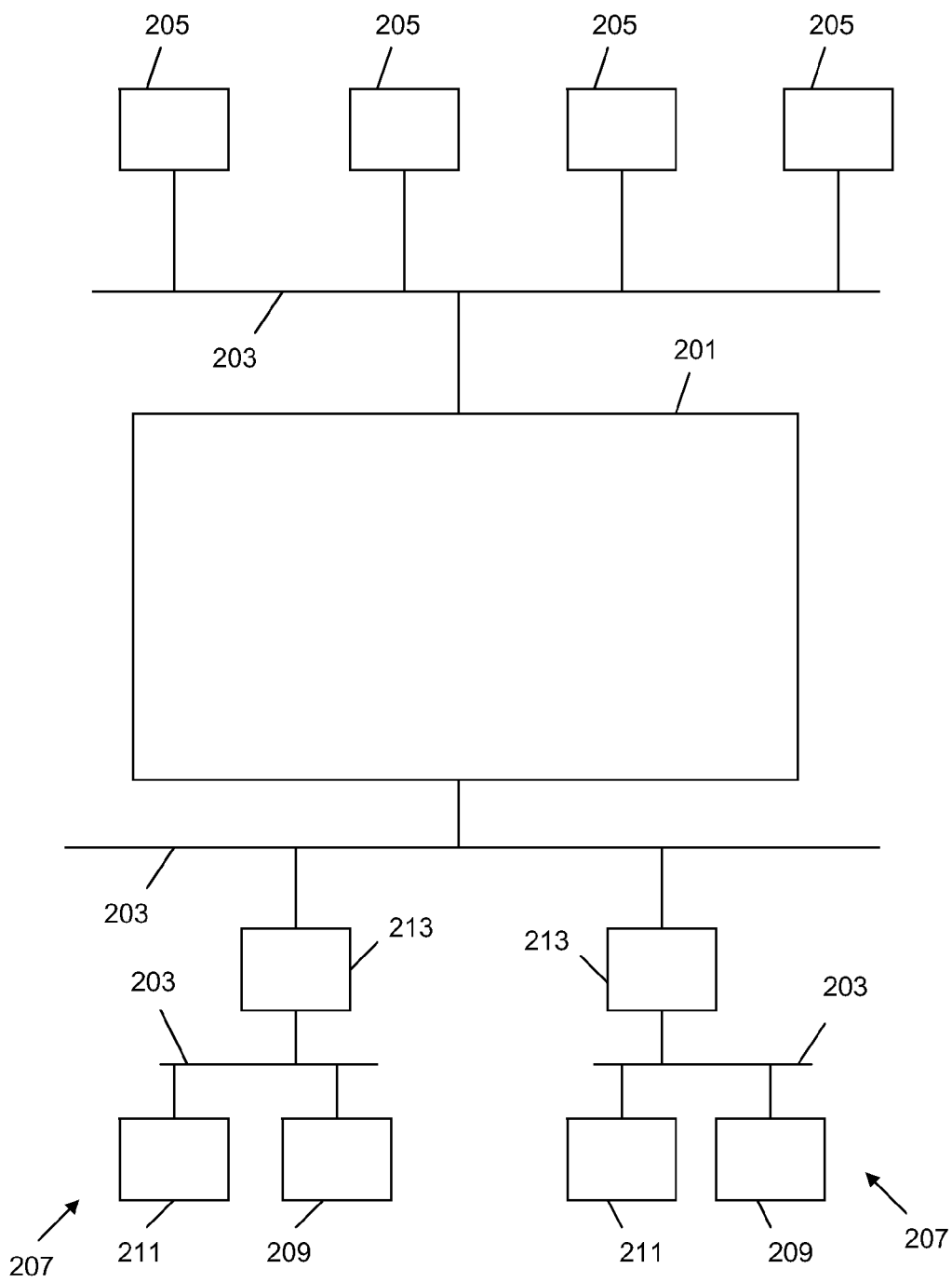
FIG. 2 illustrates an embodiment of a trading system that is configured to perform a trade.

FIG. 2 illustrates one example trading system configured to perform one or more trades. As illustrated, the trading system may include a plurality of computer systems at one or more locations. The illustrated embodiment includes a central system along with a plurality of remote computer systems. Other embodiments may include different numbers, arrangements and/or types of computer systems. For example, some embodiments may include fewer or no remote computer systems. Some other embodiments may include a more distributed or fully distributed system such as one without any central system or with a limited central system.

The central system 201 or a place at which orders are executed may be called a "marketplace". In some embodiments, various actions, such as firm order querying, firm order matching, providing indications of firm orders/firm order matches, receipt of indications that firm order queries/firm order matches exist and/or any other desired actions may occur, for example, upstream from such a marketplace.

As illustrated, the trading system may include a central system 201. The central system 201 may include one or more computer systems, each configured to perform one or more processes. Such computer systems may receive, transmit, and/or process information as desired. In some implementations, the central system 201 may be configured to perform actions including receiving information relating to orders (e.g., firm orders), matching firm orders, executing trades, facilitating the execution of trades, clearing orders, facilitating the clearing of orders, communicating with remote systems, settling orders, reporting trades, querying remote systems to determine if matching order exist, querying processes or databases to determine if matching orders exist, and/or any other desired actions.

In some embodiments, the central system 201 may be distributed among a plurality of regional hubs. Such distribution may allow a trading system to span a very large geographic area through which a very large number of trades may be routed. Such regional hubs may include duplication and/or distribution of functionality.

In some embodiments, the central system 201 may be responsible for facilitating one or more functions typically referred to as "back office" functions. For example, the central system 201 may facilitate clearing of trades, settling of trades, reporting of trades, credit checking of participants, other functions required for compliance with rules and regulations, and/or any other desired functions.

In some embodiments, the central system 201 may include a firm order matching system. Such a system may be configured to determine if firm orders match other firm orders and/or perform other functions related to such firm order matching. In some embodiments, the central system may include an order router matching module. Such a module may be configured to route order queries to one or more participants and/or perform any desired actions associated with OMS orders. In some embodiments, the central system may include a regulation NMS system. Such a system may interface with one or more other securities markets to find better pricing options for an order. Such action may be required in some embodiments because of securities regulations.

In some embodiments, the central system may be coupled to one or more remote systems by a communication network 203. The communication network 203 may include the Internet, one or more local area networks, and/or any other desired communication medium. The communication network 203 may allow the central system to transmit and/or receive information to and/or from remote systems, such as computer systems associated with market participants. In some embodiments, communication between systems, modules, processes, and/or programs may include the use of Financial Information eXchange messaging. Such messaging may be encrypted or not as desired. In some embodiments, one or more firewalls or other security device may be included in the communication network 203.

In some embodiments, system 200 may include one or more sell side computer systems, each indicated by 205. The sell side systems 205 may include one or more trading computers configured to accept information regarding security offers (e.g., firm orders to buy and/or sell securities). The sell side systems 205 may be configured to receive, send, and/or processes information. In some embodiments, the sell side systems 205 may be configured to transmit one or more indications of such orders to the central system 201 over the communication network 203. In some distributed embodiments, the sell side systems 205 may be configure to transfer information to one or more other sell side systems 205 and/or buy side systems 207. In some embodiments, the sell side systems 205 may be configured to receive information identifying a completed order execution (e.g., from the central system 201) and may provide an indication of such an indication to a user (e.g., through a trading interface). In some embodiments, the sell side systems 205 may be configured to interact with the central system 201 or an otherwise distributed system. In some embodiments, a separate computer system may act as an interface between the central system 201 or otherwise distributed system and the rest of the sell side system 205. Although the sell side systems 205 are shown as a single system, it should be recognized that any number of computers may be used to perform any desired functions of a sell side system.

Some embodiments may include one or more buy side systems, each indicated at 207. In some embodiments, all or part of the buy side systems 207 may be located with a buy side market participant. In some embodiments, all or part of the buy side systems 207 may be distributed or located at a central location, such as with central system 201.

In some embodiments, the buy side systems 207 may include one or more trader systems, each indicated at block 209. The trader systems 209 may provide an interface to one or more traders through which information may be obtained or provided. Traders, for example, may enter order information and/or receive indications associated with orders through a trader systems 209.

In some embodiments, the buy side systems 207 may include one or more OMS systems 211. The OMS systems 211 may perform one or more functions typically performed by an OMS. Such functions may include storing order information, providing order information to trader computers, and/or any other desired functions. As mentioned above, one example OMS system includes the Fidessa OMS system.

In some embodiments, the buy side systems 207 may include one or more participant systems 213. In some embodiments, the participant systems 213 may act as an interface between the central system 201 or an otherwise distributed system and the rest of the buy side system 207. In some embodiments, the participant system may perform function related to trading, such as storing order information, receiving firm order queries, executing orders, facilitating execution of orders, clearing orders, facilitating clearing of orders, transmitting order information, determining if matching orders exist, providing indication regarding order queries, searching existing orders, determining if an order is a firm order or a OMS order, and/or any other desired functions. Participant systems may enhance the functionality of traditional OMS systems by allowing otherwise unavailable pools of liquidity to become available to a market. In various embodiments, participant systems may query an OMS for updated information (pull information from the OMS), may receive updates from the OMS as information in the OMS changes (information may be pushed from the OMS), and/or synchronize with an OMS in any desired way.

In some embodiments, participant systems 213 may query (e.g., periodically, randomly, etc.) OMS systems 211 to generate a copy of an OMS database. In some embodiments, the OMS systems 211 may send information to the participant systems 213 in response to such queries and/or without any querying taking place. Such information may include indications of orders in the OMS database (e.g., updates of prior orders, changes to orders, deletions of orders, new orders, complete database copies, etc.) In some embodiments, a participant system 213 may directly access the OMS database (e.g., without the need to make a copy) of the OMS system 211, such as by querying the database. In still other embodiments, the OMs system and participant system may be a single system, and such distinctions may not be relevant.

In some embodiments, buy side order information may be maintained in confidence on buy side systems, which may be located on respective buy side participants' premises. By so maintaining the information, buy side participants may feel more secure about the use of such information for trading and be less worried about potential information leakage.

In some embodiments, one or more software modules may act as part of an OMS system 211 to provide some or all buy side functionality. Such modules may exist in addition to and/or as an alternative to the participant system 213. For example, the module may include an update to an OMS software or a companion program to an OMS software program.

Although FIG. 2 shows OMS systems, participant systems and trading systems as separate systems, it should be understood that any configuration of systems may be used. For example a single system may operate as all or part of any other systems (e.g., a single system may act as an OMS system and a participant system, etc.) Furthermore, various systems may share information and/or distribute the performance of functions. For example, an OMS system may maintain an order database that may be read by one or more or a trading system, a participant system, and/or any other desired system.

In some embodiments, one or more of the buy side or sell side systems may include mobile devices. Such mobile devices may include laptop computers, PDAs, cellular telephones, and/or any other desired mobile device.

In some embodiments one or more software modules may act as companions and/or replacements to trading interface software and/or OMS software. Such companion or replacement software may include additional and/or different options from traditional interface and/or OMS software.

Although FIG. 2 shows buy side systems 207 and sell side systems 205 as connected to separate parts of communication network 203, it should be understood that such systems may be connected to a same network such as the Internet or any other communication network.

In some embodiments, one or more participants may use a virtual OMS rather than a traditional OMS. It should be understood that reference to an OMS includes reference to such a virtual OMS. A virtual OMS may include a system that acts as a dedicated OMS for a plurality of participants, but in reality is a shared system. For example, in some implementations, a virtual OMs may include a system that is remote from a participant and accessed over the Internet. The system may include a separate database for each such participant for tracking typical OMS information. It should be understood that some systems may include a single database with a participant identifier, and/or any other method of storing information that may be used in providing virtual OMS services to participants. The use of a virtual OMS may provide a participant with OMS services without the need to maintain and/or purchase a dedicated OMS system.

Example System Processes

Figure 3:
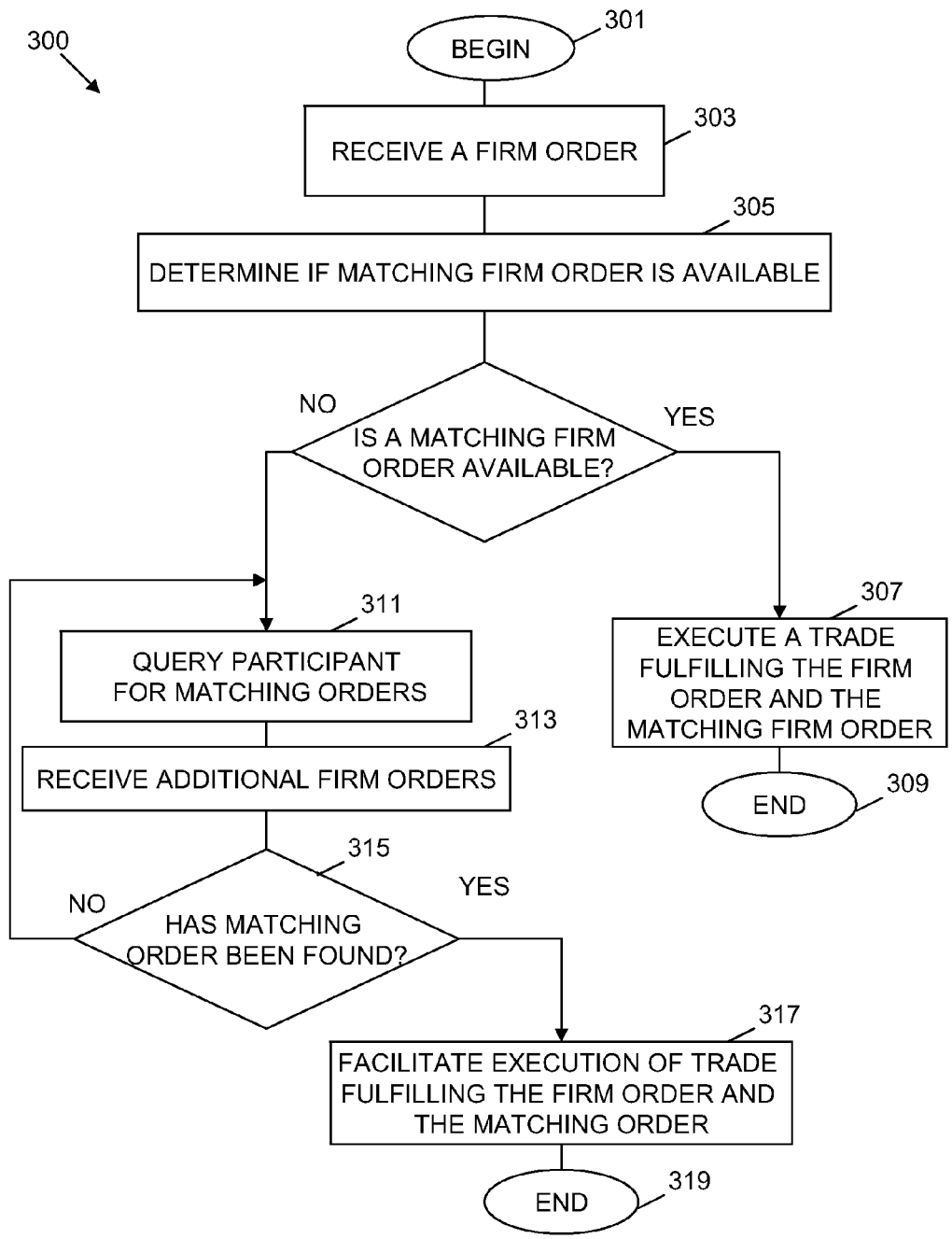
FIG. 3 illustrates an embodiment of a process that may be performed by one or more trading systems.

FIG. 3 illustrates an example process 300 that may begin at block 301. In some embodiments, process 300 may be performed by the central system 201. In other embodiments, process 300 may be performed by one or more distributed computer systems.

As indicated at block 303, process 300 may include receiving an indication of a firm order. In some embodiments, such an indication may be considered a binding indication on the part of the firm order submitter. For example, central system 201 may receive an indication of such an order from a buy side system (e.g., 207) and/or a sell side system (e.g., 205). Such orders may be entered, for example by a trader using a trading interface at a buy or sell side firm. The indication of the firm order may identify that an originator of the order is committed to a transaction (e.g., a bid, offer, etc.). In some embodiments, an indication of an order may indicate an amount of a security to buy or sell, a time for a firm order to remain open, a price at or around which to buy the security, a limit price, a pricing method, an order identifier, and/or any other information.

As indicated at block 305, process 300 may include determining if any matching firm orders are available. A matching order may include an order that includes complementary terms to the firm order. Such terms may include a security, an amount, a price, a time frame, and/or any other desired information. For example, the firm order may indicate that 10,000 shares of eSpeed stock should be purchased at an average price of $100.00 per share. A prior firm order may have been received that indicates 10,000 shares of eSpeed stock should be sold at an average price of $100.00 per share. The prior eSpeed order may be determined to match the later eSpeed order in such a situation. In some embodiments, orders within a price range, below a maximum price, above a minimum price, and/or matching in any other desired ways may also be determined to be matching. In some embodiments, orders for a larger number of smaller number of shares may be determined to be matching. In some embodiments, an indication of a firm order may identify a minimum and/or maximum order size/percentages for which other firm orders may be determined to be matching.

In some embodiments, multiple orders may be determined to be matching according to some priority mechanism so that a total number of shares of all matching orders sums to at least as much as a number indicated by the firm order indication. In some embodiments, in which multiple orders are determined to be matching, a priority may be assigned to some of the orders based one or more characteristics of the orders, an originator of the orders, and/or any other characteristic.

In some embodiments, a matching firm order may have been received from a buy or sell side system. Such a matching order may have been stored on a machine readable medium (e.g., a disk drive of the central system 201). Determining if a matching firm order has previously been received may include searching a database or other listing of previously received firm orders. Such a database may be keyed to allow quick lookup, such as by security identifier (e.g., stock symbol).

Some embodiments may include maintaining a listing of firm orders. Such a listing may include a database. Maintaining the listing may include adding newly received firm orders to the listing, deleting fulfilled firm orders from the listing, deleting expired firm orders from the listing, and/or any other desired actions.

As indicated at block 307, if one or more matching firm order is determined to exist, the execution of some or all of those matching firm orders may be facilitated to fulfill the received firm order. Each such matching orders may fully or partially fulfill the received firm order. Facilitating the execution may include performing an exchange of money for a security, clearing such an exchange, transmitting information to a remote execution and/or clearing service, notifying participants, and/or any other desired action.

In some embodiments in which multiple matching orders exist, the matching orders may be matched to the received firm order based on any desired prioritizing mechanism. Such prioritizing mechanism may include prioritizing based on price of security, first come first serve, priority given to older and/or most active originators of orders, large orders may be matched first, priority given to closest match in price and/or size, a round robin system, and/or any other desired prioritizing method. In some embodiments, multiple orders may be combined together to fully fulfill as many existing offers as possible. In some embodiments, part of each matching order may be fulfilled. The part may correspond to some characteristic of the order or order originator, such as order size, loyalty of originator, activeness of originator, actual price compared to desired price, etc.

In some embodiments, process 300 may end at block 309 if a matching firm order is found. In some embodiments, if one or more matching firm orders exist but do not completely fulfill the received firm order, execution of the matching firm order may be facilitated, and a remaining balance of the firm order may be treated as if no matching firm order had been found (e.g., may continue as described below with a firm order that includes only the left over order amount).

In some embodiments, as indicated at block 311, process 300 may include querying one or more participants to find a matching order. In some embodiments, querying the participants may include transmitting one or more requests from a central system (e.g., 201) to a buy side system (e.g., 207). In other embodiments, querying the participants may include transmitting requests from a computer of a distributed system to another computer of the distributed system, such as from one buy side participant to another, or one sell side participant to a buy side participant, etc. In some embodiments, such querying may continue from one participant to another participant in a tree like fashion in which one or more participants queries one or more further participants which may themselves continue querying further participants and so on. Such action may be taken if no matching firm order was found or an incomplete set of matching firm orders was previously found as described above. In still other embodiments, querying may include transmitting requests to other processes, threads, memory locations, portion of a computer program, etc. executing by a single system, such as central system 201 or multiple systems, such as a distributed system. Systems associated with market participants (e.g., buy side system 207, participant systems 205, 207) may be configured to accept requests and determine if matching OMS orders exist. In some situations, which are discussed in more detail below, some such systems may respond to a query indicating that a match exists. In some implementations such a response may include an indication that the trade has already been executed and/or cleared (e.g., by a remote system to which a request was transmitted, some other system, etc.).

In some embodiments, the act of querying and/or some or all response that may be received may be concealed and/or otherwise suppressed from an originator of the firm order and/or any other individual. For example, if a negative response is received, such a response may not be revealed to the originator of the firm order. In some embodiments, as discussed below, only a positive response may be revealed. In some embodiments, negative response may be eliminated or otherwise suppressed. By limiting responses, actions may be kept secret from originators of the order and the participants may be granted an additional level of anonymity, thereby encouraging them to participate in the trading system because the opportunity and/or chances to game the market may be reduced.

As indicated at block 313, process 300 may include receiving additional firm orders from various other firm order sources such as buy side and/or sell side participants. Such receipt of new firm orders may occur substantially simultaneously as the querying of participants. Such new firm orders may be compared with the received firm order from block 303 to determine if they are matching, similar to the description above with respect to block 305.

As indicated at block 315, process 300 may include determining if a matching order is found. Finding a matching order may include receiving a new firm order from another source and/or receiving a response from a participant that a matching order exists.

If no matching order is determined to exist, process 300 may loop back to block 311. In various embodiments, the participants may be queried periodically. The period may be any length, such as 30 seconds, 30 minutes, a random length, a length based on some characteristic of a trader and/or order, etc. In various embodiments, participants may be queried until either a match is found, a matching firm order is received, a time period associated with the firm order expires, the firm order is revoked, and/or any other desired length of time.

If one or more matching orders is determined to exist, process 300 may include facilitating execution of a trade fulfilling the firm order and the one or more matching orders as indicated at block 317. In some embodiments, facilitating may include executing a trade, clearing a trade, transmitting indications that execution or clearing of a trade should be performed by a remote system, and/or any other desired actions. In some embodiments, execution of the trade may occur at a remote server, such as one or more servers at which a firm order match is found (e.g., a buy side system, etc.), and/or a central system, such as central system 201.

In some embodiments, a matching order may not fulfill a whole firm order. In such situations, process 300 may continue to search for matching orders, e.g., by querying remote servers and awaiting new firm orders in a loop to block 311.

In some embodiments, multiple matching orders may be found within a relatively short period of time. For example, multiple firm orders may be received and/or multiple OMS orders may be found at participants within a relatively short period of time. Such a time period may be any amount of time desired, such as 1 second, 1 minute, etc.

In various embodiments, order execution with such matching orders found within such a short period of time may be based on some desired set of priorities. In such embodiments, matching orders found with in the short period of time may be treated as if they were found simultaneously and executed based on some other priority mechanism. For example, firm orders may be executed first, or orders found through querying participants may be executed first, first entered orders may be executed first, larger orders may be executed first, smaller orders may be executed first, older orders may be executed first, newer orders may be executed first, best customers may have their orders executed first, highest ranked customers may have their orders executed first, customers willing to be charged a fee may have their orders executed first, and/or any other method may be used to determine execution order. In other embodiments, order execution may be based strictly on the order in which the matching order is found.

Process 300 may end at block 319 after facilitation of the execution of the orders is complete. In some embodiments, one or more participants, such as originators of the orders may be notified of execution. In some embodiments, the order of acts may not be the same is indicated in process 300. In some embodiments, process 300 may include additional actions, fewer actions, and/or different actions. Process 300 or a similar process may be performed by any computer system or systems in a centralized and/or distributed manner.

Example Participant Processes

Figure 4:
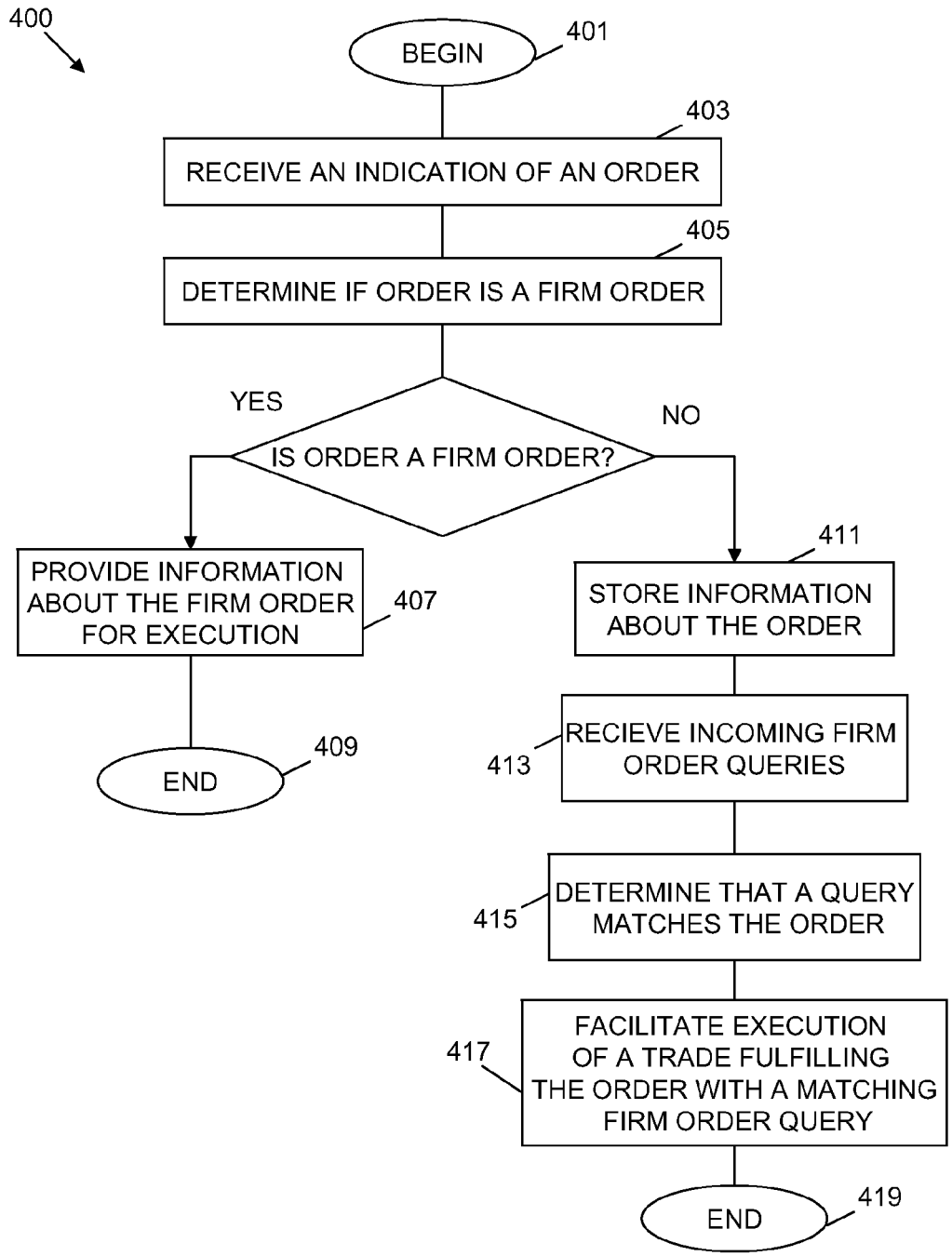
FIG. 4 illustrates an embodiment of a process that may be performed by a participant of a trading system.

FIG. 4 illustrates an example process 400 that begins at block 401 and that may be performed by a participant (e.g., by buy side system 207). In other embodiments, some or all of process 400 may be performed at a centralized location, such as by central system 201, or a distributed location, such as by sell side systems or buy side systems. Process 400 may, in part, be performed to facilitate responses to queries and/or to provide indications of firm orders, as those described above with respect to process 300. In some embodiments, process 400 may be performed by an OMS system, a separate participant system, a buy side or sell side trader's computer, or any other computer system such as one configured to receive and process orders.

As indicated at block 403, process 400 may include receiving an indication of an order. Such an indication may be received, for example, from a trader entering information about desired trades through a trading interface. The indication may include an identification of a price, an amount of a security to buy or sell, a time for an order to remain open, a price at or around which to buy the security, a limit price, a pricing method, an order identifier, and/or any other information.

As indicated at block 405, process 400 may include determining if the order is a firm order. A firm order, as described above, may indicate that an order should be executed substantially automatically. A OMS order, may indicate that the information about the order is to remain secret from other market participants and/or should not be automatically executed against. Some embodiments may not include a separate act of determining a type of order. For example, in some embodiments, different processes, threads, and/or systems may receive the different types of orders, so that the act of receiving the order itself identifies the type of order. For example, a trader may use one interface to submit an OMS order (e.g., to an OMS system, to a participant system, etc.) and use a different interface to submit a firm order (e.g., to a central system, etc.). In some embodiments, a single program may be used to submit the different order types, and the program may make the determination (e.g., based on different buttons pressed, based on different checkboxes selected, etc.).

As indicated at block 407, if the order is a firm order, process 400 may include providing the indication of the order for firm order execution. Such providing may include transmitting information about the order to the central system 201, or a distributed system. Such an order may be received by such system, which may attempt to execute the order substantially automatically (e.g., using a process similar to process 300). In some embodiments, such providing may include providing the information to a processing thread or program executed by one or more computing devices.

Process 400 may end at block 409 if the order is a firm order. In other embodiments process 400 may continue to provide updated information about the execution of the firm order, such as through an interface of a trading computer.

As indicated at block 411, if the order is not a firm order, process 400 may include an act of storing information about the order. Storing the information may include storing the information on a machine readable medium, such as in RAM, on a hard disk, etc. The medium may be part of/associated with one or more of an OMS system and/or a participant system. The information may be stored in one or more database tables configured to store information about orders. Such a database table may be arranged for easy searching of orders to determining if an incoming order request matches any of the ordered stored in the database. For example, in some embodiments, the database may be keyed by a name of a security.

Some embodiments may include maintaining stored information. Such information may be maintained similar to the maintenance of order information in a typical OMS system. In some embodiments, maintenance may include the actions of an OMS and/or a participant system. Maintenance may include updating orders executed in connection with matching firm order queries. For example, order information may be removed/updated when an order is fully or partially fulfilled, an order expires, an order is explicitly removed or updated by a trader, and/or for any other desired reason.

As indicated at block 413, process 400 may include receive incoming firm order queries. An incoming firm order query may indicate an identification of a price, an amount of a security to buy or sell, a time for an order to remain open, a price at or around which to buy the security, a limit price, a pricing method, an order identifier, and/or any other information. In some embodiments, such firm order queries may be received from one or more computer systems performing a process similar to that shown in process 300. In some embodiments, the firm order queries may include orders that would fulfill part or all of the OMS order. Such queries may be received at a participant system, an OMS system configured to perform some or all of the action of process 400, and/or any other desired location.

As indicated at block 415, process 400 may include determining that a firm order query matches the order. For example, a result from a database query that includes terms identified by the firm order query (e.g., security identifier, price, quantity, etc.) may return a positive result.

As indicated at block 417, process 400 may include attempting to facilitate execution of a trade with the matching firm order query. Facilitating execution of a trade may include, for example, displaying an indication of the firm order to a trader through one or more trading interfaces, as discussed in more detail below, raising an alarm or other audible alert for such a trader, and/or any other desired action. In some such embodiments, the trader may be asked to accept the matching order or reject the matching order. If the trader, in some embodiments, acceptance of the order, the system may execute a trade, forward information for the trade to be executed and/or cleared by another system, and/or perform any other desired action to further facilitate execution of the trade.

In some embodiments, by keeping the OMS orders secret from other trading participants, a trading system performing process 400 may encourage traders to allow pools of liquidity that would typically remain inaccessible, such as orders in OMS systems, to be used to match against firm orders. This encouragement may be particularly important to buy side participants who may typically be protective of their order information. Such use of OMS orders may increase liquidity in a market using such a process.

Process 400 may end at block 419, after facilitating execution of the trade. In some embodiments, one or more participants, such as originators of the orders may be notified of execution. In some embodiments, stored information regarding the orders may be updated to reflect the order execution. In some embodiments, in which only part of the OMS order is fulfilled by the matching firm order, process 400 may include receiving additional firm order queries and facilitating execution of those orders.

In some embodiments, the order of acts in process 400 may not be the same is indicated in FIG. 4. In some embodiments, process 400 may include additional actions, fewer actions, and/or different actions. Process 400 or a similar process may be performed by any computer system or systems in a centralized and/or distributed manner. For example, process 400 may be performed by the participant systems 205, 207, by an OMS system configured to perform one or more parts of process 400, and/or by any other system. In some embodiments, process 400 may be performed only in connection with a buy side participant.

Example Querying Processes

Figure 5:
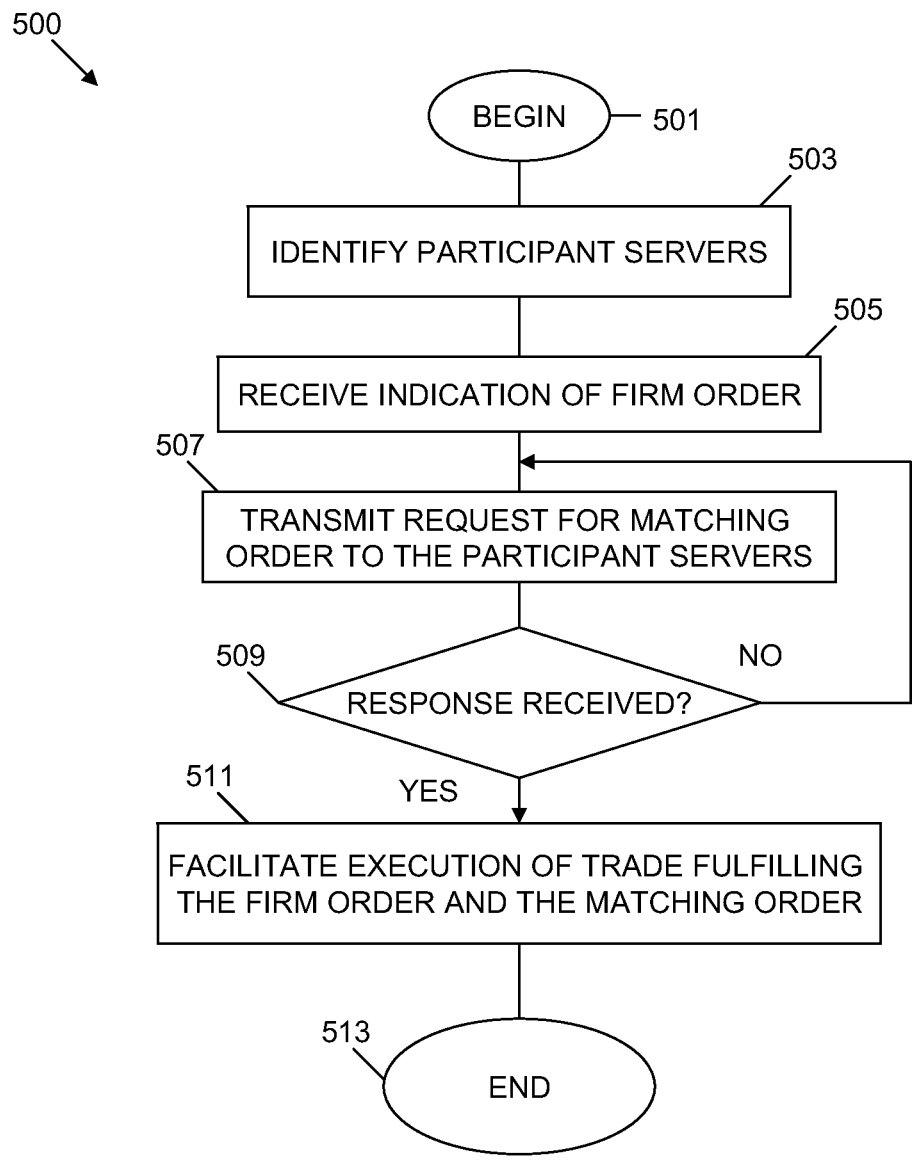
FIG. 5 illustrates an embodiment of a process that may be used to query a participant.

FIG. 5 illustrates an example process 500 that begins at block 501 and may be used, in some embodiments, to perform, in part, querying of participants, as indicated by block 311 of process 300 above. Process 500 may be performed by a central computer system to query participants for matching orders, may be performed in a distributed fashion by a plurality of computer systems, and/or may be performed by any other computer systems. In some embodiments, such a process may be performed, in part or in whole, in a tree like distributed fashion in which some participants may query one or more child participants to search for matching orders.

As indicated at block 503, process 500 may include identifying one or more participants. Participants may include one or more remote servers, one or more computer processes, threads, or programs. For example, in some embodiments, participants may include buy side systems. In other embodiments, participants may include sell side systems, and/or other systems. Identifying participants may include querying potential participants in a list of participants, (e.g., pinging IP addresses, making function calls, etc.). In some embodiments, identifying participants may include placing one or more items in a predefined memory location, querying a predefined memory location for information about participants, accessing a database or other listing of participants, receiving an indication that a participant exists (e.g., from the participant, from an administrator, etc.) and/or any other actions desired. In some embodiments, the identified participants may include child participants of a tree-like participant structure.

As indicated at block 505, process 500 may include receiving an indication of a firm order. Such a firm order may be substantially similar to the firm order received at block 303 in process 300.

As indicated at block 507, process 500 may include transmitting requests to the identified servers. Such requests may be substantially similar to those discussed above with respect to block 311 in process 300. In some embodiments, as discussed above with respect to process 300, the received firm orders may be matched against other locally stored firm orders instead of or in addition to querying of participants as discussed with respect to process 300.

In some embodiments, participants may be arranged in a distributed fashion. For example in one embodiment, participants may be arranged in a tree-like fashion. In such an embodiment, a first participant may query one or more other participants. The other participants may determine if matches exist locally. If matches exist, the participants may return a positive indication (e.g., to the originating participant, the originator of the firm order, a marketplace, etc.). If no match is found locally, the further participants may query additional participants. The order of querying may be established based on any desired priority mechanism (e.g., largest customers are queried first, premium customers queried first, highest ranked customers queried first, etc.). In some embodiments, a participant may query additional participants regardless of whether a match is found locally.

As indicated at block 509, process 500 may include determining if a response was received from a queried participant. In some embodiments, determining if a response was received may include querying a port or socket through which communication may be received from a communication network. In other embodiments, determining if a response is received may include querying a register, memory location, process, thread, program, function and/or any other action.

In some embodiments, if no responses is received, process 500 may loop back to block 507 to send one or more additional requests. Any number of requests may be sent any number of times. Any period of time may pass between transmission of requests (random, periodic, etc.). Process 500 may continue to loop until a response is received, a matching firm order is found otherwise, a time period expires, and/or any other event occurs.

In some embodiments, the participants queried at each loop may be the same or different. For example, in some embodiments, an initial group of participants may be queried first (e.g., a premium group of participants, a group of good customers, a group of high volume customers, etc), and then after some period of time a second group of participants may be queried. Any number of such subgroups may be queried in such order.

As indicated at block 511, process 500 may include facilitating execution of a trade fulfilling a matching order in the response. Facilitating may include executing a trade, clearing a trade, forwarding information requests and/or any other desired action. In other embodiments, a response may indicate that a trade has been or will be executed and/or cleared (e.g., by a remote system).

In some embodiments, a response may only be received if a match exists and/or a trader desires to execute a trade. Limiting response to positive responses may encourage participation because less information is revealed from the participants. This may incentivize participants to make orders available to a market to a great extent than in traditional markets, thereby increasing the liquidity of the market.

Other embodiments may include receiving negative response when no matching order exists and/or a trader does not desire to execute a trade.

In some embodiments, a response may be received for a trade that does not completely fulfill the firm order. In some implementations, after execution of such an order, process 500 may loop back to block 507 to query participants again. Future queries of participants may include an updated order with a requested amount decreased by the previous order. In other embodiments, such facilitation of order execution may be limited to complete orders (e.g., based on preferences indicated by an originator of the order, based on preferences of a trading system, etc.).

In some embodiments, multiple responses may be received at the same time or within a relatively short time period. Orders received as such may be treated as if they were received at the same time. A priority mechanism may be used to determine which of such orders is to be executed first. For example, an order associated with a high volume customer, a premium customer, a long term customer, or a customer with any other desired characteristic may be given higher or lower priority compared with other orders. In some embodiments, largest or smallest orders may be given priority. In other embodiments, any desired priority mechanism may be used.

In some embodiments, process 500 may end at block 513. In some embodiments, process 500 may include notifying one or more traders of the execution. In some embodiments, process 500 may include additional actions, fewer actions, and/or different actions. Process 500 or a similar process may be performed by any computer system or systems in a centralized and/or distributed manner.

Example Passive Order Processes

Figure 6:
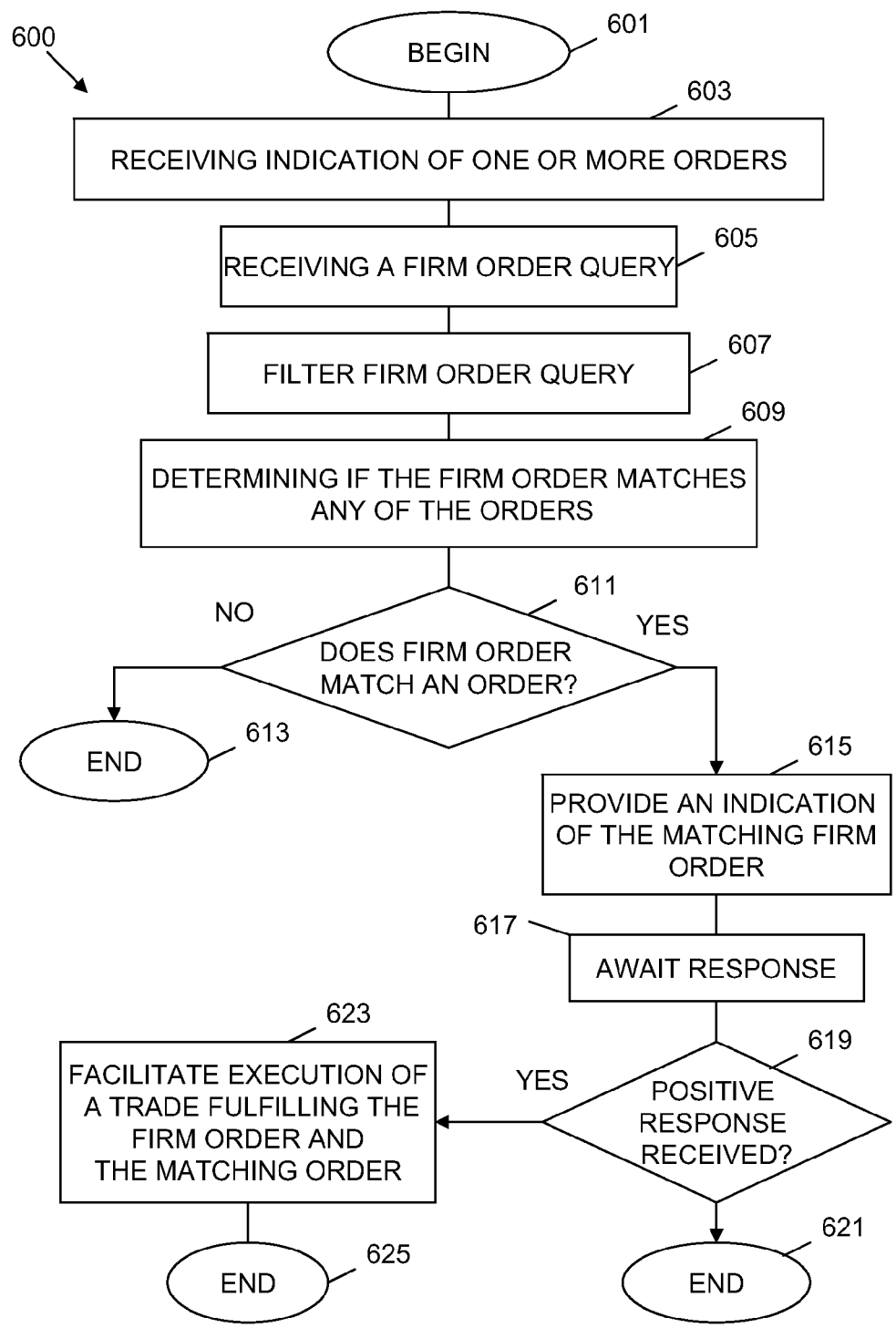
FIG. 6 illustrates an embodiment of a process that may be used in responding to queries.

Process 600 of FIG. 6 which begins at block 601 illustrates an example process that may be performed by one or more participants. Process 600 may include actions similar to process 400 described above. In some embodiments, process 600 may be performed only by one or more buy side participants.

As indicated at block 603, process 600 may include receiving one or more indication of one or more orders. Such orders may include OMS orders as discussed above with respect to process 400. The orders may be stored accordingly, as discussed with respect to block 411 so that queries may be matched against them.

As indicated at block 605, process 600 may include receiving an indication of one or more firm order queries. Such firm order queries may be transmitted, for example, by an entity performing a process similar to process 500 and/or process 300 as discussed above.

As indicated at block 607, process 600 may include filtering firm order queries. Firm order queries may be filtered based on characteristics of the order (e.g., price, security, amount (e.g., minimum amount, maximum amount), etc.), characteristics of the originator of the order (e.g., a rating of the originator, a type of the originator, specific originators, etc.), and/or orders queries may be filtered according to any other desired characteristics. In some embodiments, different filters may be applied to different types of securities. For example, large capitalization securities may have one set of filters applied and small capitalization securities may have a different set of filters applied. In some embodiments, specific securities (e.g., identified by stock symbol) may be filtered out or have a specific set of filters applied.

In some embodiments, filtering may allow a participant to filter queries received from or sent to other participants. Filtering may be performed based on any desired characteristics. Such characteristics may include characteristics that make the order less likely to be an order associated with gaming of the market. For example, in one implementations, a filter may block firm orders that do not meet a minimum size requirement, a minimum total dollar amount requirement, and/or any other desired characteristics.

In some embodiments, as another example, a participant may only desire to consider orders associated with originators with certain characteristics. Such characteristics may include characteristics that make an order less likely to be an order associated with gaming of the market. For example, in one implementations, a filter may block orders that are from a particular class of traders (e.g., hedge funds, etc.), that are associated with a particular trader that has been identified by the participant as being involved with gaming the market, that are not from a particular trusted set of participants, a from a set of participants that were rated poorly by other participants, are from a participant without a history of trading, etc.

Some embodiments may include receiving an indication of desired filters. The indication may be received from one or more traders, participant systems, or any other desired source. The indication may identify any desired characteristics, combination of characteristics, exceptions to filters, and/or any other information related to the filters.

The filters may be applied in a centralized fashions and/or a distributed fashion. For example, in some implementations, filters may be applied before requests are transmitted (e.g., by a central system, by a distributed system, etc.). Applying the filters before transmitting requests may decrease the amount of traffic associated with performing process 600. Conversely, performing such filtering before transmitting may increase the amount of processing performed before transmitting and may involve a participant revealing filtering preference they may not desire to reveal to anyone, even a trading system administrator. In other embodiments, filtering may occur locally to a participant. By performing such filtering locally, more traffic may be generated by a trading system, more processing may take place at participants, and filtering options may remain private.

In some embodiments, participants may be filtered from receiving requests based on the desires of a firm order submitter (e.g., by a central system or other participant submitting queries, etc.). Such participants may be filtered by identity, order availability, and/or any other desired characteristic. Such filtering may occur for example, by the participants themselves (e.g., by a participant system configured to perform such filtering in addition to, before, or otherwise in connection with other participant functions), by a central system, by a submitting system, and/or by any other desired system. In some embodiments, for example, a participant may not be provided with a query if they do not have a matching firm order to fulfill a minimum percentage of a firm order. In other embodiments, such information may not be known until after a query is sent, and in such embodiments, a match may only be determined to exist if the match meets the minimum percentage. Filtering before transmitting queries may decrease an amount of traffic (e.g., TCP/IP packets) transmitted which may be snooped to reveal trading information, however, a malicious user may snoop such queries in an attempt to determine a filter setting.

In some embodiments, participant systems may transmit filtering information to a central system. Such information may be used to perform the filtering at the central system. Such information may also be used to provide information to users entering firm orders, as described below.

A trading system that allows such filtering may enable a participant to open traditionally untapped pools of liquidity only to a certain subset of traders. By allowing such limitations, the participant opening that pool of liquidity (e.g., a set of orders in an OMS) may be more confident that the traders gaining access to those pools are not going to use the pools of liquidity for malicious purposes (e.g., gaming the market).

As indicated at block 609, process 600 may include determining if a matching order for the firm order query exists. Such determination may include searching one or more database or other listings of OMS orders. The determination may be made at a same or different location as the filtering. Determining may include searching a listing of orders in an OMS of a buy side participant. Such a listing may include all listed orders, a subset of listed orders identified as searchable by a trader, and/or any other orders.

As indicated at block 611, and 613, process 600 may end if it is determined that no matching order exists. Some embodiments may end without providing any indication that no order exists. By not providing specifically identifying that no order exists, others (e.g., other traders, participants, people snooping packets, etc.) may be unable to determine if no order exists or no such response was sent for some other reason (e.g., because a trader indicated that no trader should occur as discussed below, because a trade was filtered out, as discussed above, etc.). In some embodiments, no indication that the query was received may be presented to a trader or trading system associated with the participant that received the query. By keeping such information secret, receivers of queries may be prevented from using the information that the firm order exists to game the market.

As indicated at blocks 611 and 615, if a firm order is determined to exist, process 600 may include providing an indication that a firm order has been received. Providing such an indication may include transmitting information over one or more networks from one computer system to another computer system. Providing such an indication may include presenting a user (e.g., a buy side trader associated with the OMS order matched) with one or more interfaces or icon identifying the firm order. Such an interface may include options to accept a firm order, reject a firm order, ignore a firm order, ignore all firm orders (e.g., for a desire period of time), and/or any other desired options. Such an indication may be considered a non-binding indication from the point of view of the participant associated with the OMS in so much as a recipient (e.g., a participant associated with the matching OMS order) is not bound to fulfill any order based on the indication. However, an originator of the firm order may still be bound to fulfill the order if the recipient of the indication chooses to accept the order.

In some embodiments, ignoring a firm order may result in a participant opting out of receiving/matching using firm order queries for a minimum amount of time. Such an opt out time may encourage participants to accept firm order queries. The time may vary based on characteristics of the order and/or participants.

In some embodiments, a user may select various options regarding ignoring future indications. For example, a user may select that indications should be ignored unless a price associated with the firm order is at a certain level, a firm order has some desired characteristic, ignore until a certain time, ignore for a certain amount of time, ignore until the end of the day, etc.

In some embodiments, evidence that a user has selected to ignore an indication may be suppressed. For example, the information may maintained in confidence at a participant system, may be kept in confidence at a central system, or may otherwise be kept secret. In implementations where different options for ignoring an indication may selected, evidence regarding some or all of the information regarding the options may also be suppressed.

As indicated at block 617, process 600 may include awaiting a response from such an indication. Some implementations may include receiving a response and determining if the response is a positive or negative response. In other implementations a response may not be received or may only be received if the response is a positive response. In some embodiments, the amount of time to be awaited may be indicated to a trader. In some embodiments, the amount of time may vary based on one or more desired characteristics of a security, a participant, an originator and/or other desired entity.

As indicated at block 619, process 600 may include determining if a positive response is received. Determining if a response is a positive response may include determining which if any mouse buttons were pressed, which if any keyboard buttons were pressed, which interface control if any was selected, and/or any other determination of a possible entry of intent, if any.

As indicated in block 621, process 600 may end if a positive response is not received. In some embodiments after a period of awaiting, a presumptive default response may be entered. In some implementations such a default response may include a negative response. In some embodiments, an operator of an interface (e.g., a trader, an administrator, etc.) may determine the appropriate amount of time and/or the appropriate default command.

As indicated at block 623, if a positive response is received, process 600 may include facilitating a trade fulfilling at least part of the matching order and at least part of the firm order. Facilitating the trade may include executing the trade, clear the trade, transmitting information so that the trade is executed and cleared remotely and/or any other desired actions. In some implementations, facilitating may include providing a positive response (e.g., to a central server, to a buy side and/or sell side participant, etc.). The recipient of the positive response may further facilitate the execution of the trade if a trade fulfilling the firm order has not already been executed. Transmission of a positive response may be considered a binding indication of a trade in so much as the participant associated with the OMs order may be bound to fulfill the matching firm order by the indication. In some embodiments, the binding may be conditioned on the firm order not having been fulfilled previously, not on actions of the participant.

In some implementations, process 600 may include receiving an update regarding the facilitation of the execution, such an update may include receiving an indication that the execution was completed or that the execution was not completed. In some implementations, a trade may be partially completed and an update may indicate that the trade was partially completed. For example, a trade may be partially completed if when the positive response is received, only part of the firm order is still awaiting execution, and the OMS order includes a larger volume for trade. In such a situation, a trade may be cancelled in some embodiments, in other embodiments, a the OMS order may be executed to the extent that the firm order remains, and in indication to that extent may be transmitted to the participants, in still other embodiments, an originator of the OMS order may be contacted with the updated firm order information, and/or any other action may be taken.

Process 600 may end at block 625. Process 600 may include notifying one or more participants of a result of the facilitation of the execution of the trade. In some embodiments, process 600 may include additional actions, fewer actions, and/or different actions. Process 600 or a similar process may be performed by any computer system or systems in a centralized and/or distributed manner. Process 600 may be performed by one or more computer systems in a centralized and/or distributed fashion.

It should be understood that the process of querying participants is given as one example process only. In various embodiments other methods of pulling order information from one or more OMS may be used. In still other embodiments, order information may be pushed from one or more OMS to a central system or other system through which order matching occurs rather than the pulling of order information described in process 600. In such implementations, an OMS and/or participant system may be configured to provide OMS order information and updates to a trusted system for order matching to take place without the need for querying.

Example Order Entry Processes

Figure 7:
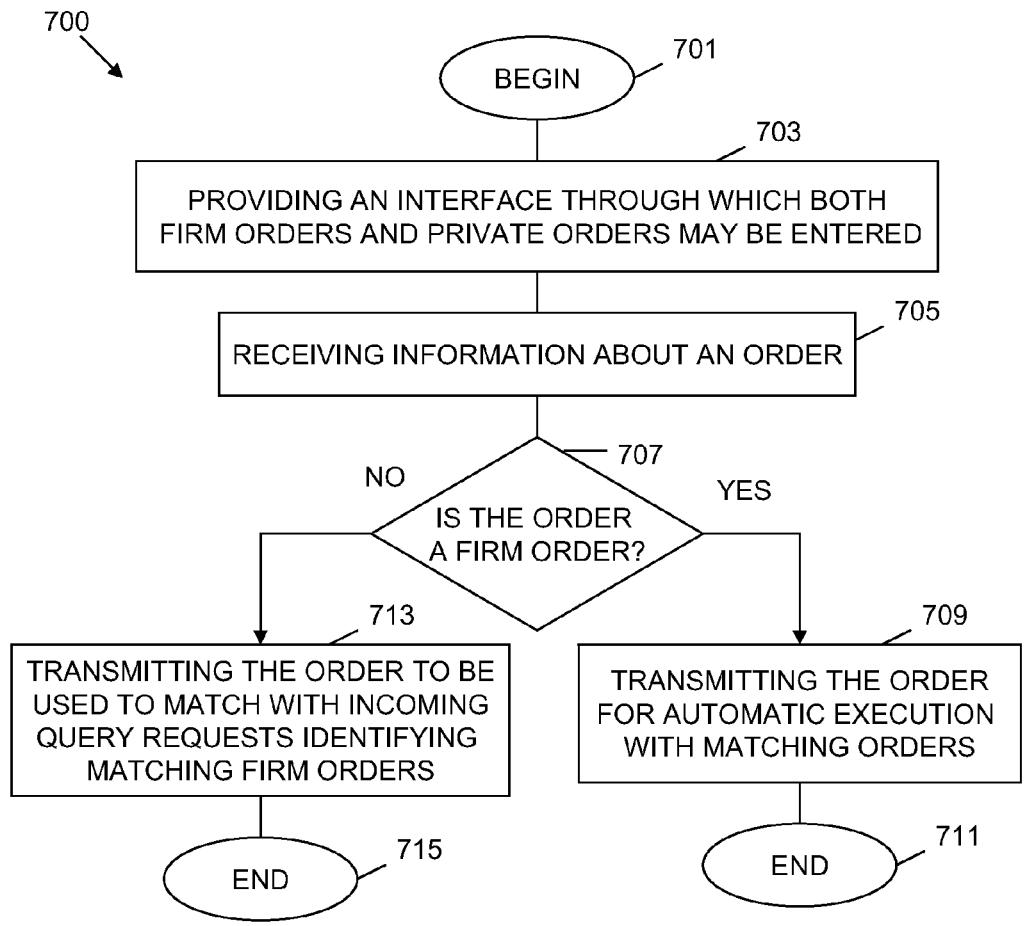
FIG. 7 illustrates an embodiment of a process that may be used for order entry.

FIG. 7 illustrates an example process 700 that begins at block 701 and that may involve interfaces used in some embodiments. Process 700 may be performed in part, for example, by an OMS, a trading terminal, and/or any other computer system. As indicated at block 703, process 700 may include providing an interface through which one or more of a firm order and/or a OMS order may be entered. Such an interface may allow a user to enter information identifying a security, a pricing policy, a price, an amount, and/or any other information about a desired trade.

Figure 8:
FIG. 8 illustrates an embodiment of an order entry interface.

FIG. 8 illustrate one example interface through which a user may enter order information. Through such an interface a user may be able to enter order types, a security desired, a pricing policy, a time in force, a limit, a minimum fill amount, a increment fill amount, an amount, and/or any other desired options. In some embodiments a same or similar interface may be used for entry of one or more of firm order and OMS order information.

Such a trading interface may illustrate information about a percentage/number of participants that may view a firm order query associated with an entered order as indicated at 801. This information may be based on filters established by the participants to filter out orders as described above. Such information may be collected by a central system (e.g., from participant systems). One characteristic that may be frequently used to filter orders includes size of the order. The percentage/number of participants may reflect the total number of participants willing to accept orders with all characteristics except size and the number willing to accept with the size characteristic. Accordingly, order originators may adjust their order size to increase or decrease the number of participants queried.

As indicated in block 705, process 700 may include receiving information about an entered order. The information may include information entered through the provided interface and/or any other information (e.g., default information, identification information, etc.).

As indicated at block 707 process 700 may include determining if the order is a firm order. Determining if the order is a firm order may include determining characteristics of an input signal, an interface control, and/or any other information. Some implementations may not include such a determination, but rather an interface, program, computer, etc. at which the indication is received or through which information related to the indication is entered may identify the type without a separate action being taken.

As indicated at block 709, if the order is a firm order, process 700 may include transmitting (e.g., to a central system, a distributed system, etc.) an indication of the firm order for automatic execution against matching orders (e.g., matching firm orders previously or later submitted, OMS orders, etc.). Process 700 may then end at block 711. In some implementation, process 700 may also include receiving information about a matching order and displaying that information through one or more interfaces.

As indicated at block 713, if the order is determined not to be a firm order, process 700 may include transmitting a representation of the order to be matched against incoming order queries e.g., by a process such as process 400. Transmitting may include providing to a different process, thread, memory location, etc. In other embodiments, a same program thread server may perform query matching, providing interfaces, receiving order information, and/or any other desired acts. As indicated at block 715, process 700 may then end.

In some embodiments, process 700 may include receiving information about the order, such as whether matching queries are received, etc. In some implementations, process 700 may be performed, for example by a trading computer, an OMS system, a central system, and/or a participant server. In some embodiments, process 700 may include additional actions, fewer actions, and/or different actions. Process 700 or a similar process may be performed by any computer system or systems in a centralized and/or distributed manner. Process 700 may be performed by one or more computer systems in a centralized and/or distributed fashion. In some embodiments, entering OMS orders in such a process may be limited to buy side participants of a market.

Example Passive Order Query Processes

Figure 9:
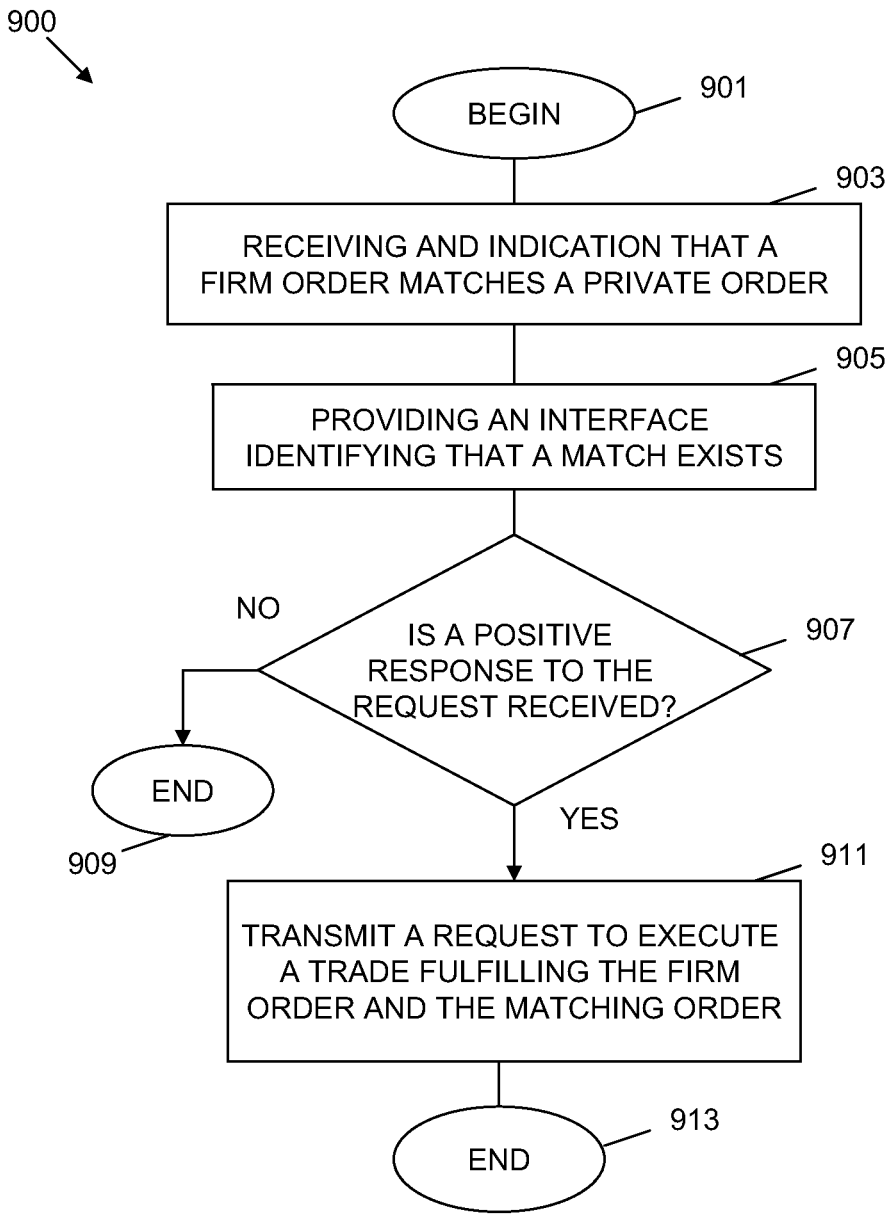
FIG. 9 illustrates an embodiment of a process that may be used to present order query information.

FIG. 9 illustrates an example process 900 that begins at block 901. Process 900 may be performed, for example, by a buy side system, sell side system, and/or any other computer system. In some implementations, a participant server, a trader's computer, an OMS, and/or any other computer system may perform one or more actions associated with process 900 and/or a similar process.

As indicated at block 903, process 900 may include receiving an indication that a firm order matches a OMS order. Such an indication may be received from one or more OMS systems, participant servers, central servers, buy side systems, sell side systems, computer programs, computer processes, computer threads, memory locations, network interfaces, and/or other desired sources.

Figure 10:
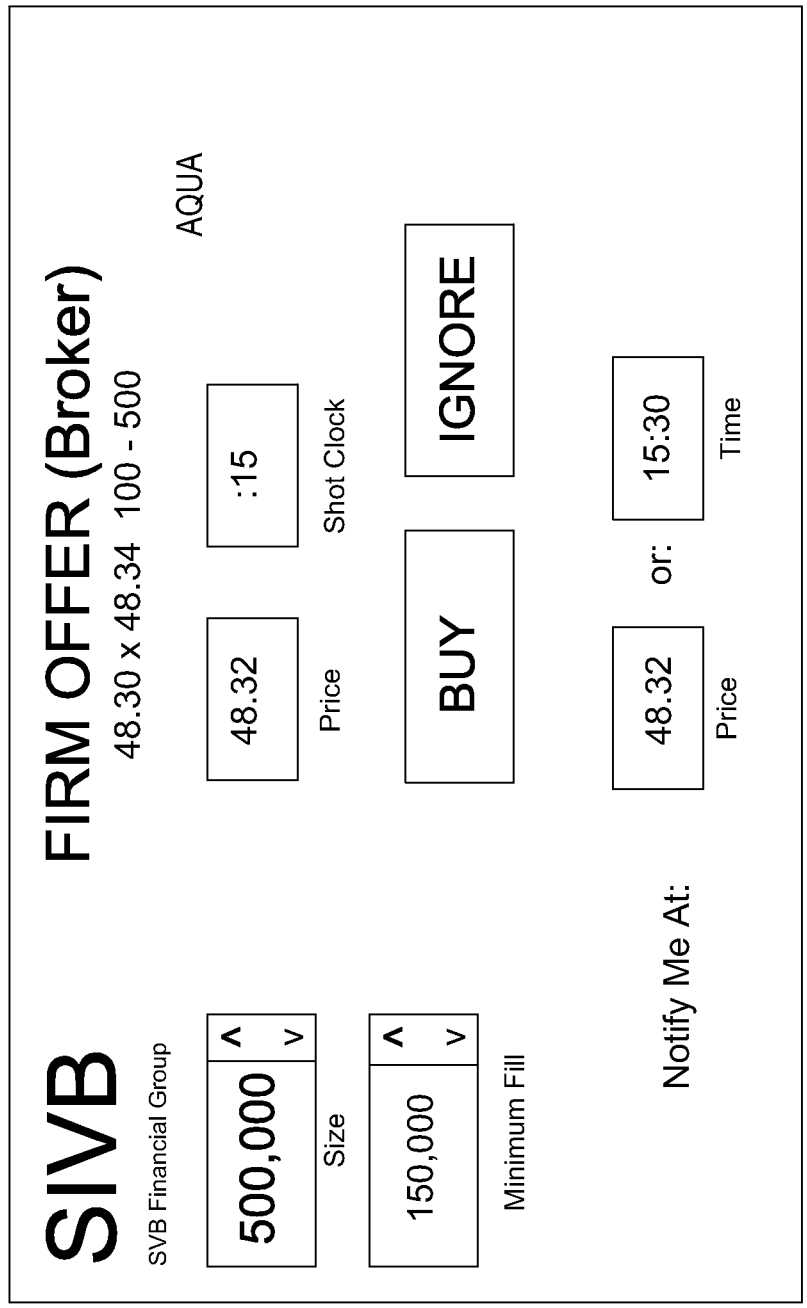
FIG. 10 illustrates an embodiment of an interface for presenting order query information.

As indicated at block 905, process 900 may include providing an interface, icon and/or other indication that a matching order exists. FIG. 10 illustrates an example interface that may be used as such an indication in some embodiments. Such an interface, as illustrated, may display some details of a matching order. Such an interface may allow a trader to indicate a positive response to the order or a negative response to the order (e.g., by operating a control, such as a button).

Process 900 as indicated at block 907 may include determining if a positive response is received with some time period. In some embodiments, the period of time may include a default time period, an amount of time according to a user profile, an amount of time according to terms of the firm order, an amount of time determined in part by a size and/or dollar value of the order, and/or any other desired amount of time. In some implementations, receiving a positive response may include receiving an indication that a control was selected. If a positive response is not received, process 900 may end at block 909.

As indicated at block 911, if a positive response is received, process 900 may include transmitting a request to execute a trade fulfilling at least part of the firm order and at least part of the matching order. Other embodiments may include otherwise facilitating the execution of such a trade (e.g., executing the trade, clearing the trade, etc.)

Process 900 may end at block 913. Other embodiments of process 900 may include receiving information about the execution of the trade, displaying information about such execution, displaying terms associated with a trade, displaying information about an originator of a firm order, updating/maintaining stored order information and/or any other desired actions.

In some embodiments, multiple firm orders may match a OMS order. In such embodiments, an indication of each such matching order may be provided. In some embodiments, the indications may be ordered according to a preference mechanism. Such preference mechanism may include ordering based on preferences of an order originator, an indication receiver, a computer system administrator, and/or any other preferences of any individual regarding any characteristics of an order, computer system, trade, etc. In some implementations, rather than providing separate indications, indications may be pooled into a single indication. Such pooling may include combining multiple firm orders according to some preference mechanism so that the firm orders fulfill the matching order. If additional firm orders exist, some implementations may separately provide information about such firm orders. In some implementations, even if indications are pooled, an interface may be provided that allows a user to access information and enter information (e.g., acceptance of orders) about individual orders.

In some embodiments, process 900 may include additional actions, fewer actions, and/or different actions. Process 900 or a similar process may be performed by any computer system or systems in a centralized and/or distributed manner. Process 900 may be performed by one or more computer systems in a centralized and/or distributed fashion. In some embodiments, only buy side participants may receive firm order queries for matching against OMS orders.

Processes 300-700 and 900 are arranged to provide convenient illustration of concepts disclosed herein. It should be recognized that no such processes need be performed at all.

Encryption

In various embodiments, some or all communication may be encrypted. In various embodiments, some or all information stored in various media may be encrypted. In some embodiments, comparisons among information may be made in an encrypted form. In other embodiments, encrypted data may be unencrypted before a comparison occurs.

In some embodiments, an encryption algorithm such as the well-known PGP, RSA encryption method may be used for communication among participants, computer systems, etc. Advances in quantum computing may make such encryption less secure in the future. Some embodiments, therefore may include use of quantum key encryption algorithms designed to overcome such vulnerability and or other future proof encryption algorithms.

User Types

In some embodiments, different users of a system (e.g., central system, buy side system, sell side system, trader computer, etc.) may have access to different options. Because a market may be asymmetrical, providing asymmetrical options to such user types may best capture a dynamic of the market. For example, in a security trading market, participants may be divided into four example categories which may include hedge funds, investors, brokers, and verified naturals. It should be recognized that other embodiments may include different, additional, alternative, fewer, and/or no categories of users.

Referring to the example four category embodiment, investors may include traders that trade on behalf of their own accounts (e.g., individuals). Hedge funds may include organizations exempt from standard securities regulation that typically seek high returns for accredited investors. Brokers may include originations that may trade on behalf of others as regulated by standard securities laws. Verified naturals may include brokers that are not acting one behalf of their own proprietary accounts. To become a verified natural, a broker may be required to provide proof that they are not trading on behalf of their own proprietary accounts. In some implementations, a single user may act as more than one type of user at various times. For example, a broker may act as a broker in some situations and a verified natural in other situations. Options and treatment given to such different categories may reflect a likelihood that the participants may be gaming the market.

In some embodiments, information provided to users may depend upon a category or type of user. For example, users may be limited to receiving certain firm order queries, accepting certain firm order matches, etc. based on their category. In one implementation, for example, only buy side participants only may receive firm order queries. In such situations, information about possible trade executions with OMS orders may not be provided to sell side participants until and unless a trade is accepted by a buy side participant and/or executed.

In some embodiments, as discussed above, rebates and charges may be given. In some embodiments, such rebates and/or charges may depend on a category of participant. For example, in some implementations, investors may be given a rebate for submitting firm orders. In other implementations, anyone submitting a firm order may be given a rebate. In some implementations, brokers may be charged a fee for each time a OMS order matches a firm order query. In some implementations, brokers can opt out of having their firm orders matched against other brokers firm orders because of pricing rebate that allows brokers to be paid for submitting firm orders.

In some embodiments, size or other characteristics of a participant may affect a participants options. Some implementations, for example, may be limited to large participants, others to small participants, others may allow all sized participants.

Possible Negotiation

Although some embodiments described above execute trades without a negotiation between participants in the trade (e.g., with only a buy or reject/ignore option presented to participants with matching OMS orders), some embodiments may include a negotiation. Such negotiation may be limited in some embodiments to preserve anonymity, encourage entering of OMS orders, and/or limit the possibility of gaming the market.

In some embodiments, for example, where there are multiple matching orders, a negotiation to determine the counter party that is willing to adjust their offer the most may be performed.

In some embodiments, if user accepts a matching firm order found from a query, the user and/or the originator of the firm order may be presented with an option to trade more of the security. By selecting a control in an interface that activates such an option, a negotiation may begin between the two participants. Such a negotiation may include asking if the other party agrees to trade more, the terms of such a trade, etc. Such negotiation may limit the probability of gaming the market since the participants may already be aware of each other from the prior trade.

Rebate

Some embodiments may include providing rebates or charging fees to trade participants. Such fees and/or rebates may be arranged to incentivize participation in certain aspects of a trading system. For example, in some embodiments, when an order is executed based on a firm order matched with a OMS order, the participant that submitted the firm order may receive a rebate, and the participant associated with the OMS order may be charged a fee.

Types of Trades

Some embodiments may support various types of trades. Such trades may include buying securities, selling securities, short selling securities, and/or any other desired types of trades. In some embodiments in which a short sell of a security is performed, a location of a purchased/borrowed security may be required before a short sell order may be completed.

Tracking Users

Some embodiments may include tracking information about one or more participants. For example, a trade history, a number of trades, a type of trades, characteristics of trades, etc. may be tracked for buy and/or sell side participants. In some information, a participant may view some or all of such information about itself and/or about other participants. In some embodiments, such information may be used to generate a rating of a participant. Such a rating may be used, for example, as a filter of participants querying a participant server.

It should be recognized that while embodiments described herein generally included a computer-human interactions (e.g., through an interface), other embodiments may be performed completely though a computer (e.g., a computer may respond to firm order queries, etc.).

It should also be recognized that while embodiments described herein generally included various securities trading, other embodiments may be used to trade any desired goods or services.

Some Information Revealed

In some embodiments, one or more participants may be given some, but not all, information about pending orders. Such information may be provided, for example, as a way of incentivizing the participant to submit an order, and/or take some action. In some implementations, the pending orders may include firm orders, and the participants may include participants with orders in an OMS. In other implementations, the pending orders may include orders in an OMS and the participants may include any participant (e.g., a participant inquiring about present orders, a participant with OMS orders, a participant with firm orders, etc.). In some implementations, the participants that are told such information may include buy side participants. In such implementations, buy side participants may be given the information, for example, without having to submit orders of their own, after submitting OMS orders related to the pending orders, after submitting firm orders related to the pending orders, and/or after any other desired event.

In some implementations, the some information may include information about one or more pending orders that does not include all the information about the pending orders. For example, the information may include the fact that one or more orders for a financial instrument are pending. The information may, for example, withhold which side the orders are for, who the orders were submitted by, the quantity of the orders, the price of the orders, and/or any other information. In other implementations, some or all of such information may be provided and other information may be withheld. In some implementations, the information may be sufficient to entice a participant who may be interested in a trade involving the pending orders to perform one or more actions but may be limited so that an effect on behavior of other participants is limited to legitimate trading activity (e.g., limit gaming of the market).

In some implementations, if the participant that was shown the information takes one or more specific actions, additional information about the pending orders may be provided. For example, if an order is submitted for the financial instrument, if an OMS order is converted to a firm order, if a positive response to an OMS query is guaranteed, etc., then the remaining information about the pending orders may be provided. Such a method of providing some but not all information before an action is taken may be used to incentive a participant to take a particular action to obtain the remained of information (e.g., if the initial information was enticing). In some implementations, orders in an OMS, order histories, and/or any other information about a participant may be tracked and used to determine if providing some information may encourage the one or more actions. In some implementations, market conditions may be tracked to determine that the one or more actions may provide needed liquidity to a market (e.g., may encourage submission of firm orders when they are lacking).

XII. Other Embodiments

What follows are embodiments, not claims:
A. A method comprising:
  receiving an order query, the order query identifying a firm order for a financial instrument;
  determining if the firm order matches an order stored by an order management system; and
  only if the firm order is determined to match the order associated with the order management system, providing a representation of the firm order, and enabling a binding acceptance of the firm order.
B. The method of claim A, further comprising:
  if the firm order is determined not to match the order associated with the order management system, suppressing evidence of the determination.
C. The method of claim A, further comprising:
  receiving an indication of the binding acceptance; and
  facilitating execution of a trade fulfilling at least part of the firm order.
D. The method of claim C, in which facilitating includes at least one of executing the trade, and transmitting a request to a remote system to execute the trade.
E. The method of claim A, further comprising:
  if an indication of the binding acceptance is not received, suppressing evidence of the determination of the match.
F. The method of claim A, in which the order query is received from a marketplace.
G. The method of claim A, in which determining if the firm order matches the order stored by the order management system includes applying a filter to the firm order.
H. The method of claim A, in which the representation is provided to a trader associated with the order management system.
I. A method comprising:
  receiving a firm order for a financial instrument; transmitting an order query identifying the firm order to each of a plurality of trading systems for comparison with orders associated with a respective order management system of each trading system;
  only if a determination that a matching order is stored in a respective order management system is made, and the firm order is accepted, receiving a reply from at least one of the plurality of trading systems identifying acceptance of the firm order; and
  in response to receiving the reply, facilitating execution of a trade fulfilling at least part of the firm order.
J. The method of claim I, in which each of the plurality of trading systems includes at least one of a respective order management system, and a respective participant system coupled to the respective order management system.
K. The method of claim I, in which receiving the firm order, transmitting the order query, receiving the reply, and facilitating execution are performed by a marketplace.
L. The method of claim I, in which the firm order is accepted by a trader associated with the respective order management system.
M. The method of claim I, in which facilitating execution includes at least one of executing the trade, and transmitting a request to a remote system to execute the trade.
N. A method comprising:
  receiving a first firm order for a financial instrument;
  determining if a second firm order matching the first firm order has been received;
  if the second firm order has been received, facilitating execution of a trade fulfilling at least part of the first firm order and at least part of the second firm order; and
  if the second firm order has not been received, transmitting an order query identifying the first firm order to each of a plurality of trading systems, each trading system configured to determine if the first firm order matches an order associated with a respective order management system, and to attempt to facilitate a trade if the first firm order matches the order associated with the respective order management system.
O. The method of claim N, in which facilitating the trade includes providing a representation of the firm order configured to allow a binding acceptance of the firm order.
P. The method of claim N, in which each of the plurality of trading systems includes at least one of a respective order management system, and a respective participant system coupled to the respective order management system.
Q. The method of claim N, in which the actions are performed at a marketplace.
R. The method of claim N, in which facilitating execution includes at least one of executing the trade, and transmitting a request to a remote system to execute the trade.
S. A system comprising:
  a computer system configured to transmit order queries identifying firm orders to each of a plurality of trading systems,
  in which each of the plurality of trading systems is configured to determine if the firm order matches an order associated with a respective order management system and to attempt to facilitate a trade if the firm order matches the order associated with the respective order management system.

T. The method of claim S, in which each of the plurality of trading systems includes at least one of a respective order management system, and a respective participant system coupled to the respective order management system.

U. The method of claim S, in which facilitating execution includes at least one of executing the trade, and transmitting a request to a remote system to execute the trade.

V. A method comprising:
submitting a firm order to a system of claim S.

W. A method comprising:
submitting an order for storage by an order management system, in which the order management system is configured to allow comparison of firm order queries with orders stored by the order management system, and
receiving an indication that a firm order query matches the order, the indication allowing a binding acceptance of the firm order query.

X. The method of claim W, further comprising transmitting an indication of the binding acceptance to a marketplace.

Y. The method of claim W, in which the binding acceptance includes an indication that a trade should be automatically executed.

Z. A method comprising:
receiving an indication of an order, in which the order includes a side of a trade for a financial instrument;
determining that a matching order is stored in an order management system associated with a participant, in which a matching order includes an opposite side of the trade for the financial instrument;
providing, to the participant, information identifying that the order for the financial instrument exists, in which the information does not include the side of the trade; and
requesting that the participant perform an action in order to receive additional information about the order.

AA. The method of claim Z, in which the action includes converting the matching order to a firm order.

AB. The method of claim Z, in which the action includes agreeing to positively respond to a query about the order; and the method further includes transmitting the query to the participant, in which the query includes a request for a binding acceptance of the order.

AC. The method of claim Z, in which the information identifies that the order for the financial instrument and a plurality of other orders for the financial instrument exist.

AD. The method of claim AC, in which identifying the existence includes identifying a number of pending orders for the financial instrument.

AE. The method of claim AD, in which the pending orders include firm orders.

AF. The method of claim AD, in which the pending orders include orders stored on an OMS.

AG. The method of claim Z, in which the information does not include an identity of a participant associated with the order.

AH. The method of claim Z, in which the information does not include a price associated with the order.

AI. The method of claim Z, in which the information does not includes a quantity of the financial instrument associated with the order.

AJ. The method of claim Z, further comprising receiving the information from an OMS.

XIII. Miscellaneous Information

Numbering of elements in the below section may not match to numbering of elements in the previous sections. This section provides additional disclosure of relevant material, and should not be interpreted to limit any prior disclosures.

Although computers are heavily used to facilitate trading of securities, manual intervention is still required at certain steps in the trading process. For example, most traders at institutional investment management firms record their orders to purchase or sell securities in computerized order management systems (OMS's). However, one or more traders at each firm must manually review the orders in the OMS and attempt to fill the orders by contacting one or more market intermediaries. Typically, the traders transmit the orders in the OMS by telephone or separate data entry links to registered broker-dealers for the securities, to electronic marketplaces that trade the securities, or to other market intermediaries. Accordingly, manual effort is required to actually execute the orders in the OMS.

One problem arising from this manual effort is that institutional traders cannot execute trades involving large quantities of securities without adversely affecting the market price of the securities. For example, institutional traders often need to trade large quantities of securities due to the continuing need of investment managers to respond to changes in market conditions by altering the contents of their investment portfolios. As these portfolios increase in size due to increased investor activity, the corresponding quantity of securities to be traded in order to achieve a similar portfolio balance also increases. Market impact costs, or adverse costs resulting from the institutional traders' activities, rise in such circumstances because locating parties with whom to trade such large quantities of securities becomes more difficult for the market intermediaries.

Moreover, if the market intermediaries become aware that an institutional firm wants to, say, sell a large block of a particular equity security, this awareness is likely to lower the sale price that the institutional firm can obtain due to the normal processes of supply and demand. The effect is also likely to be exacerbated by speculation from others with knowledge of the order as to why the particular investor wishes to sell such a large quantity of the security. Similarly, if market intermediaries become aware of the fact than an institutional firm wants to buy a large block of a particular equity security, this awareness will likely increase the purchase price that the institutional firm will have to pay. This adverse effect on price is further exacerbated by the fact that traditional market intermediaries trade for their own accounts.

One strategy commonly employed by institutional traders to offset market impact costs is to spread out trade orders for a large quantity of a security into small orders each handled by a different market intermediary, sometimes over several trading days. Of course, this strategy brings about its own problems in that the market price can change significantly during this extended trading period due to the unforeseeable activities of others.

Another strategy that may be employed is to spread the orders for the security among one or more electronic marketplaces. However, the traders must manually transmit each order to the electronic marketplaces using a telephone or a separate data entry link. The fact that the traders need to perform these extra steps, which include duplicate entry of basic order data already recorded in the OMS, causes many traders to use these electronic marketplaces infrequently, and to supply the marketplaces with only a small subset of the total orders. As a result, these electronic marketplaces often lack the liquidity required by a trader to timely execute orders.

The lack of integration between the OMS and the electronic marketplaces also poses problems when an institutional trader wishes to trade a particular security simultaneously within an electronic marketplace and, for example, over the telephone with a traditional broker. For example, some electronic marketplaces attempt to find matches at only specific time intervals. If a trader wishes to buy 100,000 shares of IBM, and has placed an order for half that amount in an electronic marketplace, the trader will not know how much, if any, IBM stock was purchased until after the next scheduled match attempt. In the meantime, the trader potentially could have purchased more than 50,000 shares from a broker over the phone at a better price.

Therefore, there is a need in the art for an electronic trading marketplace that does not require any manual intervention by traders or other parties, offers anonymity, and offers a high amount of liquidity.

The present invention addresses the above need by providing for the automated transmission of orders (i.e., without manual trader intervention) from the various order management systems (OMS's) used by investment management firms or other entities having trading systems to an electronic trading marketplace (ETM). A firm with a trading system stores information about orders in an OMS to manage its order flow, to monitor the initiation, placement, and execution of orders, and for related purposes. Software providing the functionality of an OMS is well known in the art.

OMS interfacing modules (OIMs) at the firms automatically transmit orders from the OMS's to the ETM and preferably update the OMS's in response to orders executed at the ETM. Traders can communicate with the ETM to anonymously negotiate trades of securities. As used herein, a "security" is an ownership or creditorship interest, such as a stock certificate, bond, or any other financial instrument, contract or transaction, such as a forward, futures, option, put, call, collar, swap, or currency contract on any security. This description uses the term "security" for convenience but it should be understood that the term covers financial instruments generally.

The ETM includes an OMS data integration module (ODIM) for receiving and processing data representative of orders received from the OIMs. In a preferred embodiment, the data from the OIMs are provided to the ETM in a standardized format that requires little processing by the ODIM. The orders processed by the ODIM are stored in an ETM database.

A negotiation module in the ETM supports negotiations between traders. In one embodiment, an indications module transmits orders received by the ETM among the traders based upon filtering criteria established by the traders and/or the ETM. These orders are transmitted among the traders in the form of non-binding indications. Based upon these indications, traders at one institution can enter into negotiations with traders at other institutions, through the negotiation module of the ETM. In one embodiment, at least parts of the negotiations are conducted anonymously.

A trader authentication module authorizes and authenticates traders who log into the ETM in order to perform trading negotiations and/or other functions. A transaction history module records transactions performed by the ETM in the ETM database. The transaction history module also preferably records other data processed by the ETM including, for example, the orders received from and sent to the trading systems and the conducted negotiations.

A typical trading system at an investment management firm or other entity at which trading is performed includes a number of workstations coupled to an OMS server via a network, with a trader at each workstation. Each workstation preferably executes a trader OMS interaction module (TOIM) for facilitating interactions between the trader's workstation and the OMS server. In one embodiment of the present invention, the TOIM allows a trader to add, delete, or modify open or contemplated orders stored in the OMS database. The OMS, which includes the OMS server, OMS database, and TOIM, is typically provided by an OMS vendor, though some firms have developed their own OMS's.

In connection with the present invention, each workstation also preferably executes an ETM interaction module (EIM) for facilitating interactions with the ETM. The EIM allows a trader to send information to the ETM and view and respond to information received from the ETM. Typically, this information includes information about the trader's indications, information about other traders' indications, and orders transmitted to and received by a trader during a negotiation.

The OMS database holds data representative of open, contemplated, or completed orders to buy and/or sell securities by traders using the trading system. The OIM is in communication with the OMS database and the ETM. An OMS database integration module in the OIM reads data records stored in the OMS database and, in a preferred embodiment, also creates and modifies data records stored in the OMS database upon execution of a trade through the ETM. In one embodiment, the OMS database interaction module directly accesses the OMS database and in another embodiment it sends commands to an application programming interface (API) in the OMS for accessing the database.

The OIM also includes an ETM communication module for communicating with the ETM. In one embodiment, the ETM communication module provides selected data records in the OMS database to the ETM and, in a preferred embodiment, receives data and/or instructions from the ETM regarding changes to make to the OMS database. In addition, the OIM preferably includes a data record conversion module for modifying the format of data records sent to the ETM and/or received from the ETM. The OIM also preferably includes a filtering module for filtering out specified orders by security type, security name, order type, order price, order quantity, or other category, so that those orders are not transmitted to the ETM.

Preferably, the OIM transmits to the ETM data records in the OMS database relating to a trader's orders when the trader logs on to the ETM. Once the OIM determines that the trader has logged on to the ETM, the OIM retrieves data records about that trader's orders suitable for transmission to the ETM from the OMS database. In one embodiment, the OIM converts the data records retrieved from the OMS database into a standardized format understood by the ETM. In another embodiment, this functionality is part of the ETM.

After a trader has logged on to the ETM, the OIM determines whether the contents of the OMS database have changed. If the OMS database has changed, the OIM determines whether the change should be transmitted to the ETM. In one embodiment, the OIM continues to determine whether the contents of the OMS database have changed between the time that a trader logs on to the ETM and the time that the ETM commences trading. In another embodiment, the OIM does not commence making this determination until the time that the ETM commences trading.

Because typical OMS's are complex and multi-featured, and because securities of types not handled by the ETM may be traded using the OMS, some changes to the OMS database do not necessitate a transmission of updated data to the ETM. The OIM preferably transmits changes to the database to the ETM if the changes represent new or modified orders.

The OIM preferably updates the database in response to information received from the ETM indicating executed trades or other information. In a preferred embodiment, if an execution occurred in the ETM involving an order in the OMS associated with the OIM, the OIM receives information from the ETM describing the execution. This information includes, for example, the type, amount, and price of securities traded, the time of execution, and/or information identifying the original order in the OMS database on which the execution was based. The OIM converts the received information about the execution into the format used by the OMS and updates the OMS database accordingly. As a result of these steps, the OMS is updated automatically and transparently to reflect executions performed at the ETM. The executions appear to the OMS as typical trades conducted at another broker, so no special functionality needs to be added to the OMS in order to interact with the ETM beyond that functionality described herein.

Figure 11:
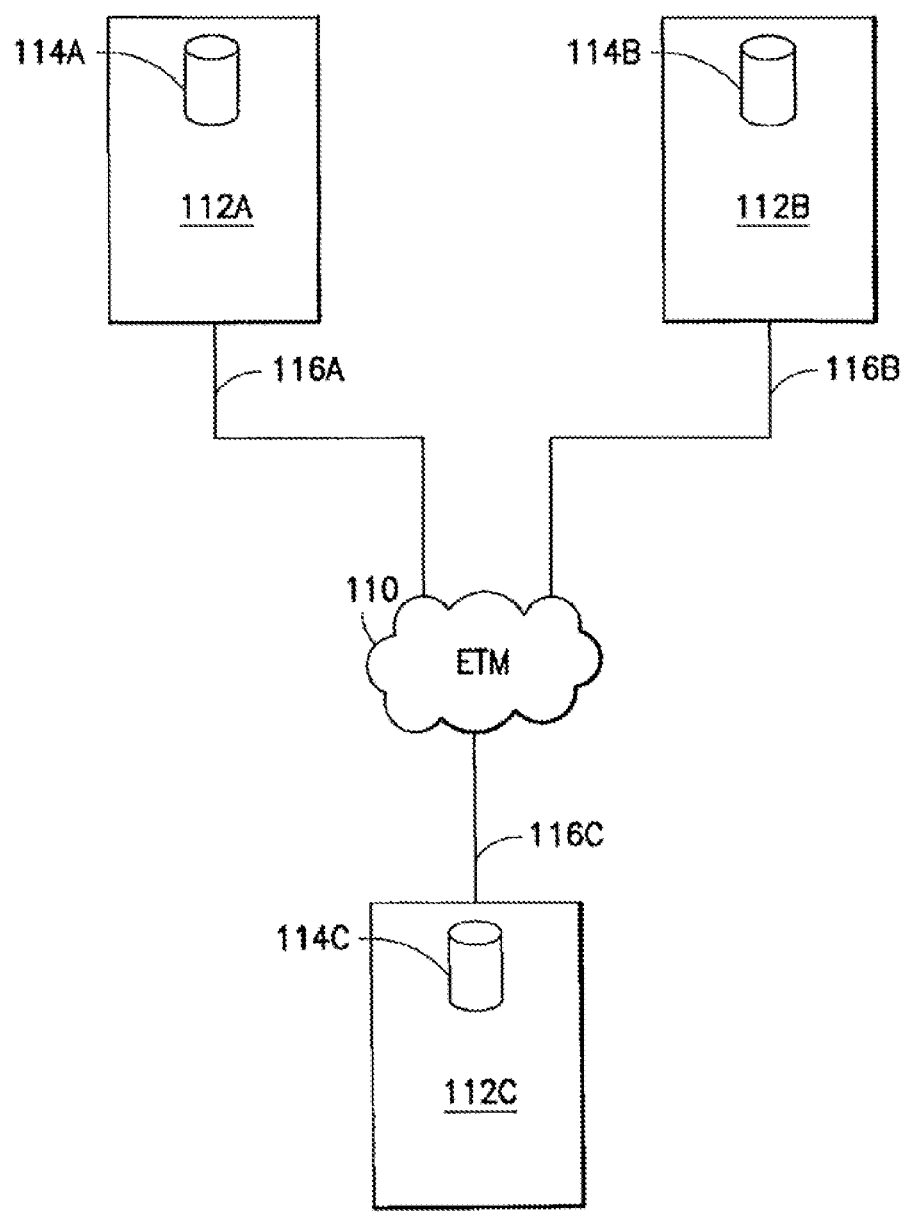
FIG. 11 is a block diagram illustrating an electronic trading marketplace (ETM) environment according to an embodiment.

FIG. 11 is a high-level block diagram illustrating an electronic trading marketplace (ETM) environment according to an embodiment of the present invention. An ETM 110 is in communication with three trading systems 112A, 112B, 112C. Although only three trading systems 112 are illustrated, embodiments of the present invention can have many more (or fewer) trading systems 112 in communication with the ETM 110. FIG. 11 illustrates only three trading systems 112 in order to enhance the clarity of this description.

The trading systems are used by investment management firms or other entities that have established a relationship with the ETM 110. The trading systems 112 communicate with the ETM 110 to facilitate the trading of securities. As used herein, a "security" is any ownership or creditorship interest, such as a stock certificate or bond, or any other financial instrument, contract, or transaction, such as a forward, futures, option, put, call, collar, swap, or currency contract. This definition includes, for example, any note, stock, bond, debenture, certificate of interest or participation in any profit-sharing agreement or in any oil, gas, or other mineral royalty or lease, any collateral trust certificate, investment contract, voting-trust certificate, certificate of deposit, any put, call, straddle, option, or privilege on any of the foregoing, or group or index of securities (including any interest therein or based on the value thereof). This list is not all-inclusive. For purposes of clarity, this description will describe the trading of stock.

Within each trading system 112 is a database 114A, 114B, 114C associated with an order management system (OMS). Each OMS database 114 holds data representative of open, contemplated, or completed orders to buy and/or sell securities (collectively referred to herein as "orders for securities") by traders using the trading system 112. For example, assume that the database 114A of trading system 112A contains orders to sell 50,000 shares of DELL and 75,000 shares of MSFT and orders to buy 25,000 shares of CPQ and 100,000 shares of IBM. Also assume that the database 114B of trading system 112B contains orders to sell 30,000 shares of CPQ and buy 62,000 shares of T.

The orders in the OMS databases 114 are automatically transmitted to the ETM 110. Likewise, any changes in the orders, such as modifications and/or withdrawals, are automatically transmitted to the ETM 110. As used herein, the term "automatically" means that the associated action is performed without any human or manual intervention. Thus, there is no need for traders to specifically request that individual orders in the OMS databases 114 are transmitted to the ETM 110; orders in the databases are sent to the ETM 110 without the traders' input (subject to filtering criteria).

Preferably, the ETM 110 anonymously transmits information about a trader's orders to other traders using the ETM, subject to filtering in accordance with filtering criteria established by the traders and/or the ETM. Moreover, the ETM 110 preferably manages anonymous negotiations between traders using the trading systems 112 for the purpose of executing the orders and sends data about the completed trades to the OMS's of the traders involved in the transaction.

Thus, one embodiment of the present invention selectively broadcasts information about the orders received by the ETM 110 from the database 114A of trading system 112A to the other trading systems 112B, 112C. Likewise, the ETM 110 selectively broadcasts information about the orders received from the database 114B of trading system 112B to the other trading systems 112A, 112C. If the traders desire such a trade, the ETM 110 will facilitate the anonymous negotiation and sale of 25,000 shares of CPQ from a trader using trading system 112B to a trader using trading system 112A.

Data is communicated between the trading systems 112 and the ETM 110 using interfacing links 116A, 116B, 116C. Any known interfacing technologies can be used to effectuate these links, including, but not limited to, transmission control protocol/Internet protocol (TCP/IP), satellite, cellular, and/or radio frequency (RF) links, or some combination thereof. The links may pass through one or more intermediate data processing systems, such as telephone switches or Internet servers, before reaching the ETM 110 or a trading system 112. In embodiments where data travels over shared links, such as embodiments where data travels over the public Internet, the data is preferably encrypted using a secure protocol, such as the secure sockets layer (SSL).

Figure 12:
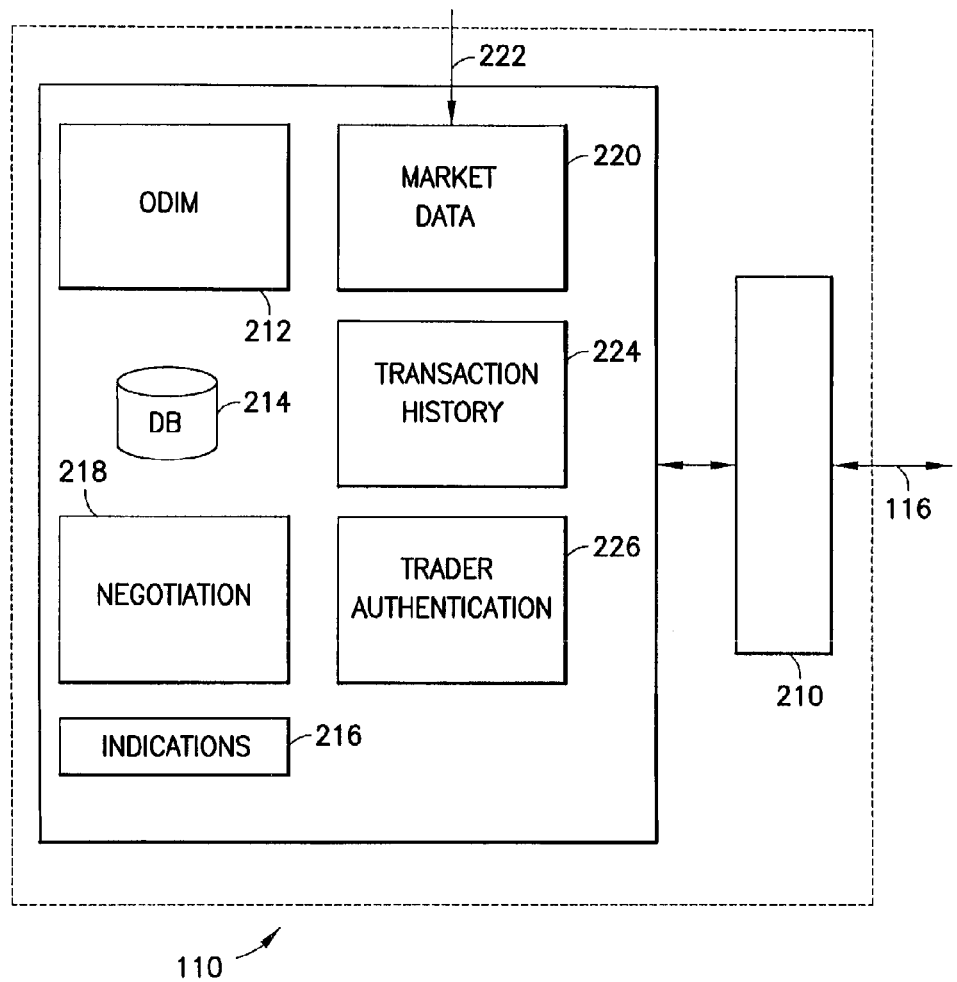
FIG. 12 is a block diagram illustrating more details of the ETM.

FIG. 12 is a high-level block diagram illustrating more details of the ETM 110. Those of skill in the art will recognize that FIG. 12 illustrates only one possible embodiment of the ETM 110. Obviously, different combinations of hardware and software can be used to provide the functionality of the ETM 110 described herein.

Data received by the ETM 110 from the trading systems 112 over the interfacing links 116 are received by a firewall 210. As is known in the art, the firewall 210 preferably prevents unauthorized users from gaining access to the rest of the ETM 110 and monitors transfers of data to and from the network.

Data that pass through the firewall 210 are received by one or more modules that perform the functionality of the ETM 110. As used herein, the term "module" refers to machine-executable code and/or data, but may also include associated circuitry, such as processing circuitry, as well as data storage areas, and/or any other software or hardware. Thus, it will be appreciated that one or a combination of hardware and software, such as a computer system executing software for performing the functionality of the modules, may implement each of the modules shown in FIG. 12. It will also be appreciated by those skilled in the art that the ETM 110 may comprise one or more other types of modules, circuitry, etc., not shown in FIG. 12 in order to avoid unnecessarily obscuring understanding of the invention. For instance, the ETM 110 may include one or more microprocessors, network connection circuitry, and/or data storage areas, such as read-only memory (ROM), random-access memory (RAM), CDROM, DVD, tape drive, hard disk (HD), and/or other types of storage areas. It will also be appreciated that the functionality of multiple modules described herein can be combined into a single module and the functionality of a single module can be split or shared among multiple modules. Moreover, alternative embodiments of the present invention can lack one or more of the modules described herein and/or have modules not described herein.

The ETM 110 preferably includes an OMS data integration module (ODIM) 212. The ODIM 212 receives and processes data representative of orders received from the OMS databases 114 in the trading systems 112. In a preferred embodiment, the data from the OMS databases 114 are provided to the ETM 110 in a standardized format that requires little processing by the ODIM 212. In an alternative embodiment, the data from the OMS databases 114 are provided to the ETM 110 in one or more different formats depending upon factors such as the type of OMS used by the trading systems 112, the types of interfacing links supplying the data to the ETM, the type of security or orders to which the data pertains, and the like. In this latter embodiment, the ODIM 212 preferably converts the data into a standardized format for use by other modules in the ETM 110.

The orders processed by the ODIM 212 are stored in an ETM database 214. Data in the database 214 are preferably accessible to the other modules in the ETM 110. In addition, the other modules in the ETM 110 can store other data in the illustrated database 214 or other databases as may be required during normal operation.

In a preferred embodiment, an indications module 216 transmits information about orders received by the ETM 110 among the various traders based upon filtering criteria established by the traders and/or the ETM. This information is transmitted among the traders in the form of non-binding indications.

Based upon these indications, traders can enter into negotiations with other traders through a negotiation module 218. The negotiation module 218 facilitates negotiations between traders using trading systems and having contra interests. In one embodiment, at least parts of the negotiations are conducted anonymously, in order to limit the spread of information about the traders' activities.

A market data module 220 receives real-time and other market data from an input 222. The market data module 220 provides the market data to the negotiation module 218 and to the traders. The traders preferably use the market data during the negotiations to determining market prices for the securities.

A transaction history module 224 records transactions performed by the ETM 110 in the database 214. The transaction history module 224 also preferably records other data processed by the ETM 110 including, for example, information about orders received from and sent to the trading systems 112 and the negotiations conducted (successful or not). This module 224 is preferably used to audit the transactions conducted on the ETM 110.

A trader authentication module 226 authorizes and authenticates traders who log into the ETM 110 in order to perform trading negotiations and/or other functions. In one embodiment, the trader authentication module 226 stores authentication information, such as a login ID/password pair in the database 214. The trader authentication module 226 also preferably stores profiles for the registered traders.

Other modules that may be present in the ETM 110 include load monitoring modules for monitoring the load on various servers comprising the ETM, fault tolerance modules for providing fault tolerance to the ETM, security modules for preventing and detecting security violations on the ETM, and back office modules for providing back office functionality. These modules are not shown in FIG. 12 in order to avoid unnecessarily complicating the figure.

Figure 13:
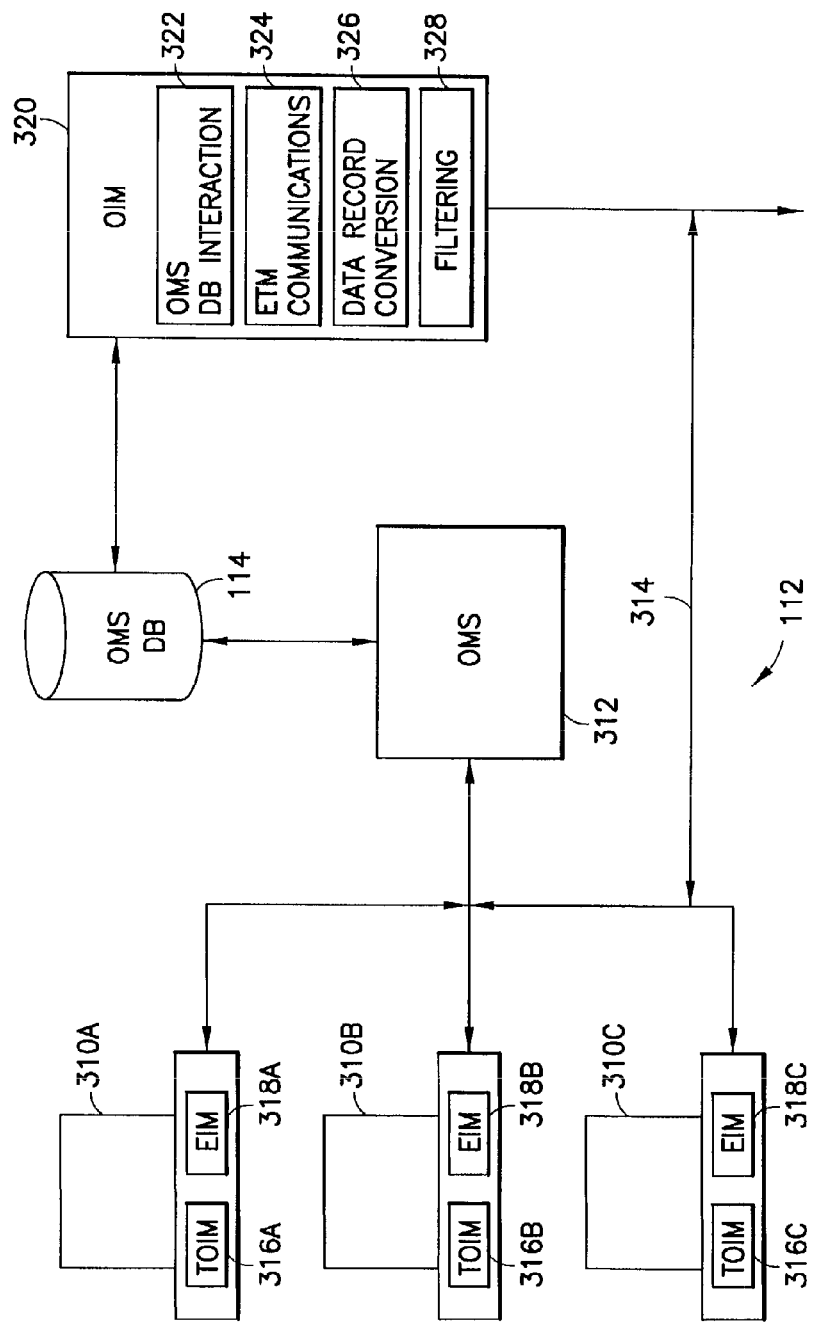
FIG. 13 is a block diagram illustrating a trading system like those illustrated in FIG. 11.

FIG. 13 is a lower-level block diagram illustrating a trading system 112 like those illustrated in FIG. 11. Those of ordinary skill in the art will recognize that FIG. 13 illustrates only one possible embodiment of a trading system 112 and alternative embodiments of the trading system exist. FIG. 13 illustrates three workstations 310A, 310B, 310C coupled to an OMS server 312 via a network 314. The workstations 310 are preferably general- or specific-purpose computer systems executing specialized software for facilitating trading of securities. Although only three workstations 310 are illustrated, a trading system 112 can have any practical number of workstations.

In a typical trading system that interacts with the ETM 110, each workstation 310 executes a trader OMS interaction module 316 (TOIM) for facilitating interactions with the OMS server 312. In this typical trading system, the TOIM 316 allows a trader to add, delete, or modify open or contemplated orders stored in the OMS database 114. Contemplated orders may be stored in the OMS database 114, for example, because the trader intends to execute certain transactions in stages, or because the contemplated transactions are desirable only if the market prices of the securities to be traded are within a certain range (e.g., limit orders). Therefore, such orders serve as placeholders indicating the total quantity of a security that a trader wishes to transact and conditions for transacting other orders; other data in the database 114 indicate the quantity of the security that has been transacted to date.

Each workstation 310 executes an ETM interaction module 318 (EIM) for facilitating interactions with the ETM 110. In alternative embodiments of the present invention, the EIM 318 is incorporated into the TOIM 316 or other modules on the workstation 310. The EIM 318 allows a trader to send information to the ETM 110 and view and respond to information received from the ETM 110. Typically, the received information includes information about orders (through the indications module 216) and orders (through the negotiation module 218) that the ETM 110 receives from other traders or trading institutions. The trader uses the EIM 318 to enter into and transact negotiations to buy and/or sell securities through the ETM 110.

The network 314 connects the workstations 310 to the OMS 312 and to external networks such as the network in communication with the ETM 110. The network 314 can utilize any networking technology that supports bi-directional transfer of data among the OMS 312, workstations 310, and external networks. In a typical embodiment, the network 314 is a private local area network (LAN) installed at a financial institution and interfacing with one or more external gateways. In alternate embodiments, the network may be wireless, connect devices over a wide area, and/or at least partially carry data over a public network (such as the Internet). Other network components, such as a firewall, may also be present. Those of ordinary skill in the art will recognize that many different types of networks can perform the functionality described herein.

The OMS 312 is preferably comprised of one or more computer systems for executing and maintaining an order management system. The OMS 312 receives instructions from the workstations to create, modify, and/or delete orders and updates the database 114 accordingly. Software providing the functionality of the OMS 312 is well known in the art. Commercial OMS software packages are available from The MacGregor Group, Eze Castle Software, Advent Software, and Decalog, to name but a few. In addition, some trading institutions utilize custom OMS software.

As described above, the database 114 holds data representative of open, contemplated, or completed orders to buy and/or sell securities. FIG. 14 is a diagram illustrating a data record 400 stored in the database 114 to identify an order according to one embodiment of the present invention. Different OMS systems utilize different order data records and, therefore, it should be understood that FIG. 14 illustrates only one possible data record. However, many OMS systems store the same general information and the illustrated order data record 400 is intended to represent a typical order data record for an OMS system.

The order data record 400 has multiple fields, each field holding different information about an order. The Order ID field 410 preferably holds a value uniquely identifying the order associated with the data record 400. Similarly, the Trader ID field 412 preferably holds a value uniquely identifying the trader or other person who placed the order. The Order Status field 414 identifies whether the order is open, contemplated, completed, canceled, or any other possible status. The next field, Order Last Update Time 416, preferably holds a timestamp that identifies the last time that the data record 400 was modified in any way. This field 416 is useful for determining whether the most recent version of the data record 400 has been considered.

The Transaction Type field 418 preferably indicates whether the data record 400 corresponds to an order to buy or sell a security. The Security Symbol field 420 preferably uniquely identifies the security to be transacted. The Security Symbol field 420 can hold, for example, a Committee on Uniform Securities Identification Procedures (CUSIP) number, a ticker symbol, or any other identifier of the security. The Security Type field 422 is preferably used to interpret the other data in the data record 400 according to the given security type. For example, treasury bills are priced in terms of a discount to face value; inherent in the pricing formula is the yield that would be obtained if the bill were held to maturity. In contrast, equity securities are priced in actual per-share values. The information in the Security Type field 422 can also be used to filter out certain types of securities.

The Order Type field 424 preferably indicates whether the order is a market or a limit order, although the field can also indicate other order types. If the order is a limit order, the Limit Price Field 426 preferably identifies the price set by the trader.

The Total Order Size field 428 preferably identifies the actual number of shares that the trader desires to transact. The Quantity Placed Elsewhere field 430 is a value either equal to or less than the value in the Total Order Size field 428. In an embodiment of the present invention, the ETM 110 uses the values of these two fields 428, 430 to determine a quantity of a security, if any, that are available to be transacted by the ETM.

Preferably, the OMS 312 allows for the possibility that trading a large quantity of a given security may occur over several days at several different venues. For example, to fill an order to buy 1,000,000 shares of IBM, a trader may need to place an order for 300,000 shares with one broker, and record numerous executions of portions thereof until the full 300,000 shares placed with that broker are purchased. If the broker cannot provide additional shares at a suitable price, the trader may then place an additional quantity, up to the 700,000 shares remaining to be purchased, via another broker, electronic marketplace, or other venue. Preferably, the broker enters a placement record into the OMS database 114 to indicate that the trader anticipates executing a portion of the order through the second venue. This second venue may also fill the quantity it was asked to provide in several executions. Thus, an order can have one or more placements and each placement can have one or more executions associated with it.

Figure 15:
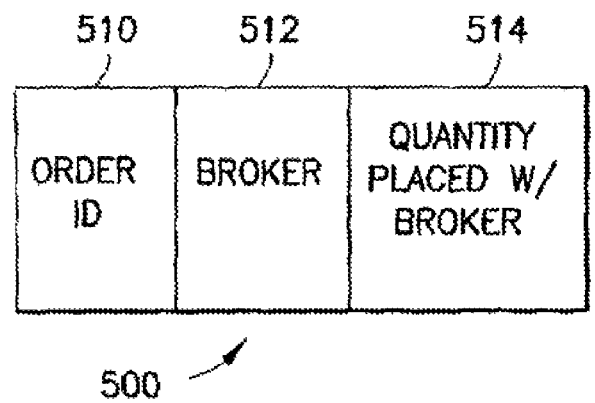
FIG. 15 is a diagram illustrating an embodiment of a placement record which may be stored in the OMS database to indicate a placement of an order at a particular venue.

FIG. 15 is a diagram illustrating a placement record 500 preferably stored in the OMS database 114 to indicate a placement of an order at a particular venue. The Order ID field 510 preferably holds a value that uniquely identifies the order associated with the placement. The Order ID field 510 ties the placement information to the overall order. Thus, all placements for the same order preferably have the same value in this field 510. The Broker field 512 preferably contains an alphanumeric value identifying the venue associated with the placement record. Lastly, the Quantity Placed with Broker field 514 preferably lists the portion of the total order size that is placed for fulfillment through the venue.

Figure 16:
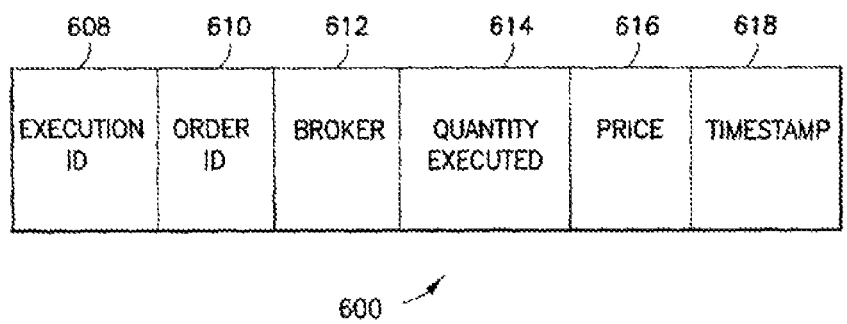
FIG. 16 is a diagram illustrating an embodiment of an execution record which may be stored in the OMS database to indicate the execution of an order.

When a transaction is executed in a specified venue, such as the ETM 110, a corresponding execution record is preferably stored in the OMS database 114. FIG. 16 is a diagram illustrating an execution record 600 according to an embodiment of the present invention. An execution ID field 608 preferably holds a value identifying the particular execution. As before, the Order ID field 610 preferably holds a value that uniquely identifies the order associated with the execution and all executions for the same order preferably have the same value in this field 610. The Broker field 612 preferably contains an alphanumeric value identifying the venue that performed the execution. The Quantity Executed field 614 preferably specifies the number of securities transacted in this execution while the Price field 616 specifies the price at which the securities were executed. The Timestamp field 618 preferably records the time at which the execution took place.

The OMS interfacing module (OIM) 320 is in communication with the OMS database 114 via the network 314 or a direct connection. In alternative embodiments, the OIM 320 is in communication with the OMS 312 and/or the workstations 310. The OIM 320 is also in communication with the ETM 110 via an external gateway or some other form of network connection. In another alternative embodiment, the OIM 320 is integrated into the ETM 110 and is remote from the OMS 312, although some functionality is present at the OMS in order to provide OMS data to the OIM.

In a preferred embodiment, the OIM 320 includes a computer system storing and executing software for performing the functionality described herein. In an alternative embodiment, the OIM 320 executes on the same computer system as the OMS 312. In one embodiment, the OIM 320 includes an OMS database interaction module 322 for interacting with the OMS database 114. The OMS database interaction module 322 reads records stored in the OMS database 114 and, in a preferred embodiment, creates and modifies data records stored in the OMS database 114. In one embodiment, the OMS database interaction module 322 directly accesses the OMS database 114 and in another embodiment it sends commands to an applications programming interface (API) in the OMS 312 for accessing the database.

The OIM 320 also preferably includes an ETM communication module 324 for communicating with the ETM 110. In one embodiment, the ETM communication module 324 automatically provides selected data records in the OMS database 114 to the ETM 110 and, in a preferred embodiment, receives data and/or instructions from the ETM. In addition, the OIM 320 also preferably includes a data record conversion module 326 for modifying the format of the data records sent to and/or received from the ETM 110 and a filtering module 238 for filtering out specified orders by security type, security name, order type, order quantity, order price, or some other factor or category, so that filtered orders are not transmitted to the ETM.

Figure 17:
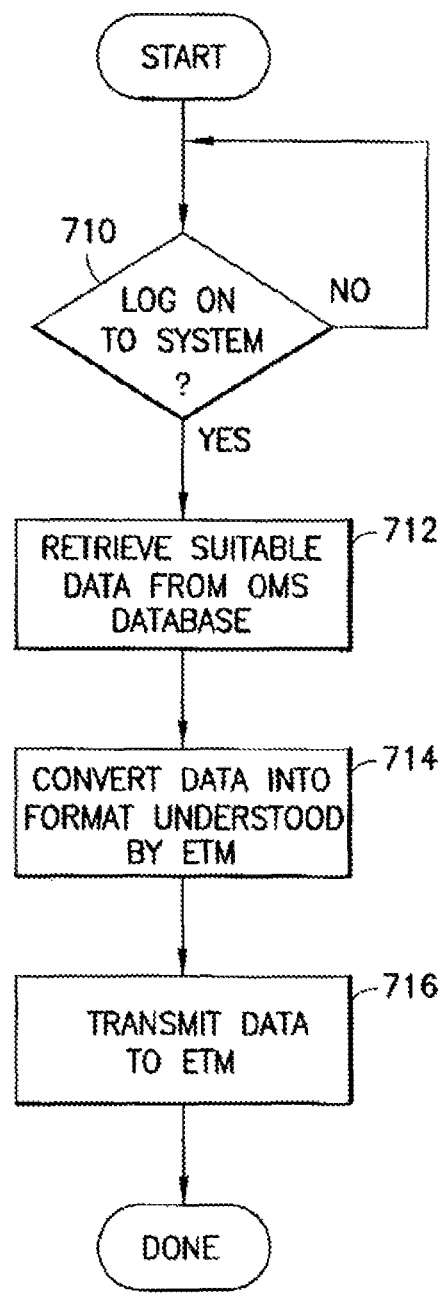
FIG. 17 is a flow diagram illustrating actions performed by an embodiment when a trader logs on to the ETM.

FIG. 17 is a flow diagram illustrating actions performed by an embodiment of the present invention when a trader logs on to the ETM 110. Although the actions of FIG. 17 and subsequent figures are attributed herein to the OIM 320, one of ordinary skill in the art will recognize that all or some of the actions can be carried out by other entities.

Preferably, the OIM 320 waits 710 until a trader logs on to the OMS 312 before transmitting data records for that trader to the ETM 110. In one embodiment, the ETM 110 sends a message to the OIM 320 when a trader at the institution in which the OIM 320 resides logs into the ETM. The OIM 320 interprets this message as a sign to commence receiving orders. In other embodiments of the present invention, the OIM 320 uses other techniques, such as querying the OMS database 114 for specific entries, listening for an inter-process message sent by the OMS 312, polling individual trader workstations 310, or implementing a timer-based algorithm, to determine that a trader has logged on to the OMS 312.

Once a determination 710 is made that a trader has logged on to the OMS 312 the OIM 320 retrieves 712 data records about orders suitable for transmission to the ETM from the OMS database 114. In one embodiment of the present invention, all open orders are suitable for transmission to the ETM 110. In other embodiments of the present invention, the OIM 320, through the filtering module 328, makes the determination of suitable orders based on other criteria, such as the security type (e.g., stock or bond), security name (e.g., IBM or T), order type (e.g., market or limit order), order quantity, and/or order price.

If necessary, the data record conversion module 326 within the OIM 320 preferably converts 714 the data records retrieved from the OMS database 114 into a standardized format understood by the ETM 110. As described above, the functionality of the data record conversion module 326 can also be performed by the ODIM 212 in the ETM 110. Alternative embodiments of the present invention may send the data records individually or in multiple batches. The data transmitted to the ETM 110 depend on factors such as the types of securities being traded, and/or the fields required in order to accurately trade such securities.

Figure 18:
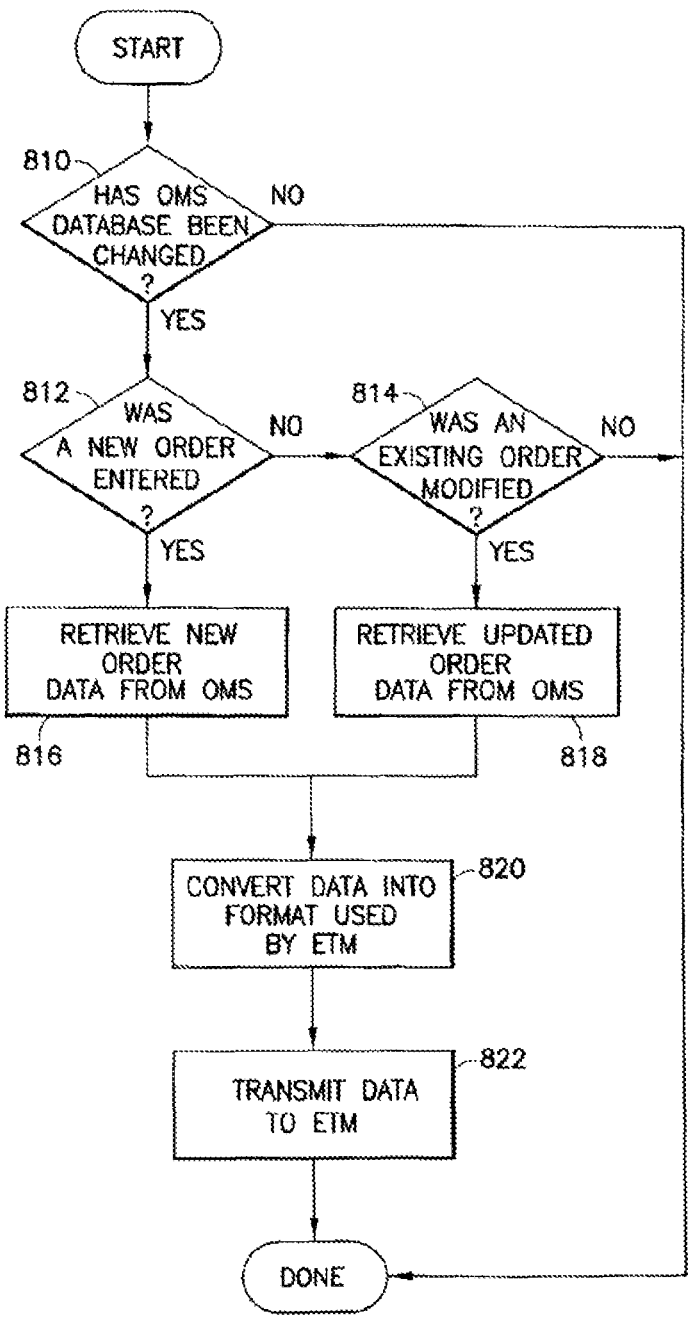
FIG. 18 is a flow diagram illustrating actions performed according to an embodiment after a trader has logged on to the ETM.

FIG. 18 is a flow diagram illustrating the actions performed by an embodiment of the present invention after a trader has logged on to the OMS during the trading day. The actions of FIG. 18 are preferably automatically performed multiple times during the trading day. Initially, the OIM 320 determines 810 whether the contents of the OMS database 114 have changed. The OIM 320 can perform this step by, for example, polling the database 114 at regular, near-real-time intervals, querying the database for contents of specified fields such as timestamps, and/or listening for network or specific interprocess communication message traffic.

If the database has changed, the OIM 320 preferably determines whether the change should be transmitted to the ETM 110. Because typical OMS's are complex and multi-featured, and because securities of types not handled by the ETM 110 may be traded using the OMS 312, some changes to the OMS database 114 do not necessitate a transmission of updated data to the ETM 110. Thus, the OIM 320 determines 812 whether the change to the database 114 reflects a new order of a type that is traded in the ETM 110. If so, then the OIM 320 retrieves 816 the pertinent data for the order from the database 114. If the change does not reflect a new order, then the OIM 320 preferably determines 814 whether the database change pertains to a modification of an existing order that has already been sent to the ETM 110. If so, the OIM 320 retrieves 818 the data records corresponding to the modified order from the database 114. Once the appropriate data records, if any, are retrieved from the database, the OIM 320 preferably converts 820 the data records into the appropriate format and transmits the records to the ETM 110 as described above with respect to FIG. 17.

Figure 19:
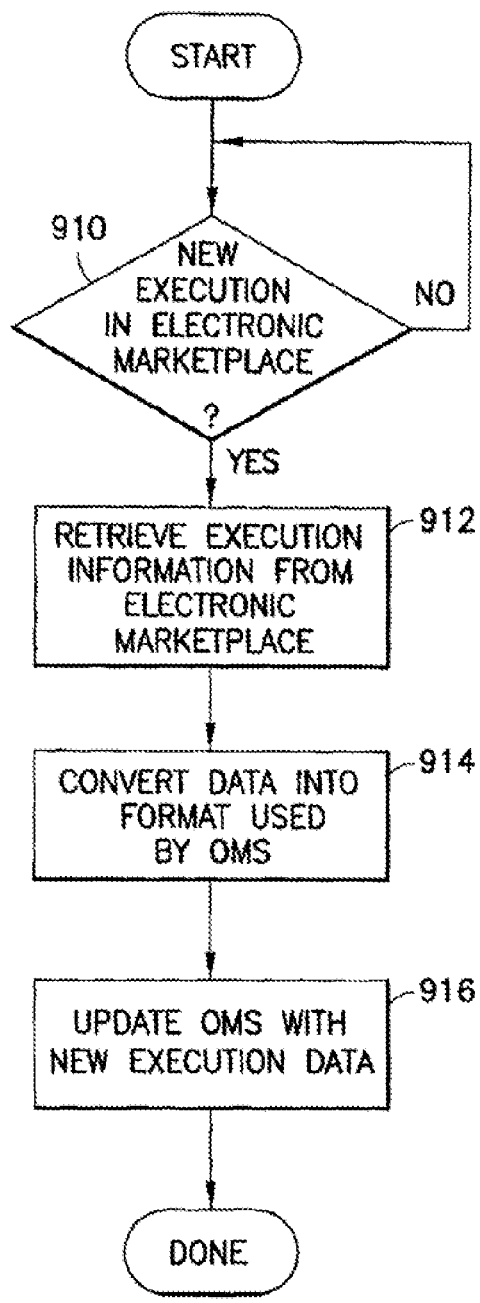
FIG. 19 is a flow diagram illustrating actions performed according to an embodiment when the OMS database is updated in response to a trade executed by the ETM.

FIG. 19 is a flow diagram illustrating the actions performed by an embodiment of the present invention when the OMS database 114 is updated in response to a trade executed by the ETM 110. The illustrated steps can be performed each time a trade is executed, or in batch. However, the steps are preferably performed frequently enough so that the OMS database 114 is updated in substantially real-time.

The OIM 320 initially determines 910 whether an execution occurred in the ETM 110 involving an order in the OMS 312 associated with the OIM. The step may be performed, for example, by receiving a message from the ETM 110 identifying a particular execution that occurred at the ETM, by filtering a list of all executions or other data from the ETM for executions listed in the OMS 312, or by periodically polling the ETM for performed executions.

If an execution occurred in the ETM 110 involving an order in the OMS 312 associated with the OIM 320, the OIM receives 912 information from the ETM describing the execution. This information includes, for example, the type, amount, and price of securities traded, the time of execution, and/or information identifying the original order in the OMS database 114 on which the execution was based. The OIM 320 converts 914 the received information about the execution into the format used by the OMS 312. Then, the OIM 320 updates 916 the OMS database 114 with the converted execution data. As a result of these steps, the OMS 312 is updated automatically and transparently to reflect executions performed at the ETM 110. The executions appear to the OMS 312 as typical trades conducted at another broker.

In summary, the present invention includes an electronic trading marketplace that generates liquidity, at least in part, by receiving order information directly from the databases of OMS systems at trading institutions. Since orders are extracted from the OMS databases automatically, and information about executed orders is inserted into the databases automatically, the OMS databases "see" the marketplace as "just another market intermediary." Moreover, traders are able to conduct trades in the electronic marketplace without any duplicative manual efforts.

According to an embodiment, a price (e.g., a price at which a potential trade for a financial instrument would be deemed acceptable) is calculated based on a cost (e.g., a cost that would be imposed by that trade). In an embodiment, determining a cost imposed by a possible trade includes determining the change in tracking error that the possible trade would cause (or is likely to cause), and determining a cost that would be imposed by that change in tracking error. That cost may then be recovered by charging a premium for that possible trade.

A portfolio is a set of one or more assets, such as stocks, bonds, other securities, options, futures, other derivatives, other financial instruments, cash, contracts and/or other assets. In an embodiment, a portfolio may consist of only assets of the same type (e.g., consist exclusively of different stocks such as a plurality of shares of Microsoft stock and a plurality of shares of IBM stock). In an embodiment, a portfolio may include assets of more than one type (e.g., include different stocks and also equity futures). A portfolio may include an amount of cash and/or any cash equivalents, in addition to other types of assets.

The term 'tracking error' is used broadly and includes any measure of how much a portfolio (e.g., a portfolio of financial instruments) deviates from a measurement (e.g., a benchmark such as an index). In an embodiment, a portfolio may be designed to closely mimic or intended to closely mimic an index or another measurement. In an embodiment, a portfolio may be designed to replicate (consistently, on average or from time to time) the returns of an index exactly, close to exactly or within a predetermined range (e.g., within a predetermined percentage of the return of the index). For example, the portfolio may be designed such that the return of the portfolio differs from the return of the index by no more than a return of 0.5%. In such an embodiment, the return of the portfolio could be designed to vary from as low as the return of the index minus 0.5% to as high as the return of the index plus 0.5%.

Any desired model or methodology of calculating the tracking error (or any other desired measurement of deviation) of a portfolio may be used. For example, a known formula for calculating the ex-post tracking error calculates tracking error based on the standard deviation of the difference between the returns of a portfolio and the return of an index, measured over a particular period of time. That formula thereby calculates the standard deviation of the active returns of the assets (e.g., stocks).

An index comprises a plurality of indication of assets (e.g., a plurality of indications of certain stocks). The identification of an asset can include the name or other manner of uniquely identifying the asset. An index also comprises, for each identification of an asset, a respective weight or portion of the index which that asset constitutes.

A stock index fund is a type of portfolio that is designed or intended to replicate (in whole or in part) the returns of a particular set of stocks in particular portions, such as the set of stocks and respective portions that are defined by the S & P 500 index. The stocks represented by the S & P 500 index are five hundred large cap common stocks traded in the United States. The components of that index (the individual stocks) have corresponding respective portions.

A portfolio may be designed to replicate a benchmark such as an index by including or attempting to include all of the assets (e.g., financial instruments) that constitute the index in approximately or exactly the same proportions as the index. Another method of replicating a benchmark is for the portfolio to include representative assets. In an embodiment, a portfolio can be intended to partially or entirely replicate a benchmark but nevertheless the returns of the portfolio may (consistently or intermittently) deviate from the returns of the benchmark. The deviation may arise from, e.g., attempts by a manager of the portfolio to generate active returns or to lower transaction costs.

There are a number of ways to represent a portfolio's constituent assets. In an embodiment, for a portfolio that has N assets, let w be a N×1 matrix (also called a "vector") such that the sum of all elements of w is 1. Expressed another way, ($\Sigma_{i=1}^{N} w_i = 1$) and $w_i$ indicates the percentage of a portfolio that the $i^{th}$ asset represents. A value of $w_i$ greater than zero indicates a percentage of the $i^{th}$ asset that is owned by or otherwise included in the portfolio. A value of $w_i$ equal to zero indicates that no amount of the $i^{th}$ asset is included in the portfolio. A value of $w_i$ less than zero indicates a percentage of the $i^{th}$ asset that is sold short (e.g., owed from the portfolio to another). In an embodiment, the portfolio includes no short sales and thus all weights $w_i$ are greater than or equal to zero.

Similarly, let y represent the N×1 matrix of weights of another measurement (e.g., weights of an index or other benchmark) such that the sum of all N elements of y is 1. Expressed another way, ($\Sigma_{i=1}^{N} w_i = 1$). In an embodiment, for any i from 1 to N, $w_i$ and $y_i$ both represent the particular $i^{th}$ asset. Thus, for example, if $w_7$ represents the portion of the portfolio that includes stock of Microsoft Corporation, then $y_7$ represents the portion of the benchmark (e.g., a particular stock index) that includes stock of Microsoft Corporation.

It may be desirable to determine how a portfolio differs from a benchmark or other measurement. For example, it may be intended for any of a variety of reasons that a portfolio (consistently, on average or from time to time) match a benchmark, e.g., exactly, close to exactly or within a predetermined range (e.g., within a predetermined percentage of return).

A cost may be assigned to a portfolio that deviates from the target measurement (e.g., deviates from an index such as the S & P 500 index) using any desired formula or methodology for determining a cost from such a deviation. In an embodiment, a "tracking error cost" may be assigned to a portfolio that deviates from the target measurement. In an embodiment, the deviation may be represented as the vector (w−y). The vector (w−y) may also be referred to as the "active weights". In an embodiment, the term 'cost' is used broadly and includes negative costs, which may be considered to be a benefit.

The predicted or estimated variance of the active weights ("tracking variance") may be calculated using the following:

$$(w-y)'V(w-y)$$

where:

(w−y)' is the transposition of vector (w−y) and thus (w−y)' is a 1×N matrix. The apostrophe denotes the transpose operation on a matrix, so A' is the transpose of matrix A.

V is an N×N variance/covariance matrix of the returns of the N assets that are indicated for the portfolio w and the benchmark y.

In an embodiment, the tracking error may be defined as the square root of the variance of the active weights, and thus the predicted tracking error can be defined as the square root of the predicted variance of the active weights. Any other formula, methodology or manner of computing a predicted or estimated deviation may be employed besides those described explicitly herein, whether such deviation is a form of tracking error or merely any other desired measurement of the deviation in the portfolio.

The matrix V of covariances may be calculated in any of a number of known manners.

A cost may be assigned to the deviation (w−y), or to any other deviation between w and y besides an difference between each of the corresponding elements of w and y. In an embodiment, a cost is assigned to the tracking variance of the portfolio position w, and this cost is referred to herein as "tracking error cost". This tracking error cost generally indicates the desirability of the portfolio replicating the performance of the measurement it is intended to replicate (e.g., a stock index). For example, a tracking error cost of holding a portfolio position w for time duration τ may be calculated according to various methodologies. For example, one acceptable cost formula for the portfolio position w (which represents a deviation from a benchmark y by w−y) is represented by the following, and is in units of return per time:

$$[(w-y)'V(w-y)](\tau/\rho) \qquad \text{EQUATION \#1}$$

where:

τ is the length of time that the portfolio position w (and thus the length of time that the deviation w−y) is in effect. Generally, τ is in units commensurate with the units of V. Thus, for example, if V is in units of daily return squared, then τ can be in units of days.

ρ is a tolerance for tracking error. Thus a greater value of ρ corresponds to greater tolerance for deviations from the benchmark, and therefore a greater value of ρ generally corresponds to a lower cost attributed to deviation from the benchmark.

Any other formula, methodology or manner of computing a cost for a deviation may be employed besides those described explicitly herein. For example, consistent with the formula above, a value that represents the ratio (τ/τ) may be used instead of using two separate values τ and ρ.

Tracking error tolerance $\rho$ may be set to be any value deemed acceptable, e.g., deemed acceptable due to the tolerance the managers of an index fund have for tracking error. The value for tracking error tolerance $\rho$ would typically be set according to a variety of factors, e.g., a desired competitiveness with respect to other funds having comparable tolerances for tracking error. For example, it is expected that the relative risk aversion of certain funds would correspond to about $\rho=0.01$, and it would be acceptable for such funds to employ a range of approximately $0.005<=\rho<=0.05$. It is also expected that the relative risk aversion of funds that are even more risk-averse would correspond to about $\rho=0.001$, and it would be acceptable for such funds to employ a range of approximately $0.0005<=\rho<=0.005$.

The cost of tracking error (or other costs of deviations from a target measurement) may be used to determine or to set a price for a transaction, e.g., a purchase or sale of an asset. For example, by assigning a dollar cost to the incremental tracking error a transaction (e.g., a purchase or sale) would induce, such a transaction can be considered desirable if the value recovered from that transaction equals or exceeds the dollar cost of the incremental tracking error. Thus, in such an embodiment, the potential transaction must increase the value of the portfolio by at least the amount of this dollar cost in order to be deemed a desirable transaction according to that criterion. In an embodiment, this dollar cost is considered the minimum amount that must be recovered from a trade (i.e. a purchase or a sale) to make the trade desirable. If the dollar cost of the transaction would be negative, the trade reduces the cost of tracking error, so the dollar cost represents the maximum amount that should be paid in exchange for the ensuing reduction in tracking error.

Where the dollar cost of the incremental tracking error is negative (as typically would occur when the transaction would reduce tracking error), a dollar benefit is assigned to the tracking error that the transaction would eliminate. Such a transaction can be considered acceptable if the value paid for that transaction equals or is less than the dollar benefit of the reduction in tracking error.

After a trade from the portfolio involving an an asset, the weight of that asset in the portfolio changes. For example, if the portfolio acquires a quantity of a particular financial instrument (e.g., buys a number of shares of a particular stock j), then the weight of that financial instrument increases (e.g., $w_j$ increases). Similarly, if the portfolio disposes of a quantity of a particular financial instrument (e.g., sells a number of shares of a particular stock j), then the weight of that financial instrument decreases (e.g., $w_j$ decreases). The change in $w_j$ (which is due to, e.g., a change in the shares of stock j held by the portfolio) depends on the percentage of the value of the portfolio that is spent buying the stock j or that is received in selling the stock j. In other words, the (positive or negative) change in $w_j$ may be expressed as the ratio of (i) the amount of the portfolio involved in the transaction for $w_j$ (e.g., spent buying the stock j, received in selling the stock j) to (ii) the total value of the portfolio.

In an embodiment, if the amount of stock j in the portfolio before such a transaction is represented as $w_j$, then the amount of stock j held after such a transaction may be represented by:

$$w_j + C_j/F$$

where

F is the total value of the portfolio (e.g., the sum of the values of all financial instruments and cash included in the portfolio). F may be in any units, such as dollars or other currency units. Typically, $F>0$.

$C_j$ is the cost (e.g., in the same units as F) of acquiring or disposing of shares of stock j (or other asset j where j represents an asset other than a stock). Thus, the ratio $C_j/F$ represents the portion of the value of the portfolio that is employed in buying or selling the shares of stock j. In an embodiment, $C_j<0$ represents a sale of stock j and $C_j>0$ represents a purchase of stock j. In an embodiment, $C_j$ may include various constituent costs such as, e.g., the price paid for assets, costs of trading (e.g., transaction fees), commissions and other fees.

In an embodiment, the cost $C_j$ includes only the cost of the asset, e.g., the cost of the shares of stock j. In such an embodiment, the amount of stock j in the portfolio before such a trade is represented as $w_j$, then the amount of stock j held after such a trade can be represented by:

$$w_j + sP_j/F$$

where s is the change in the number of shares of the stock j held by the portfolio.

$P_j$ is the price (e.g., in the same units as F) at which each share of stock j is bought or sold (assuming all s shares are bought or sold at the same price). Thus, the absolute value $|s P_j|$ would be the amount spent in purchasing the stock j or the amount received in selling the stock j.

Although for the purposes of this illustrative example s shares of a stock are bought or sold, the teaching is also applicable to any other asset besides stocks and any other measurement of quantity besides shares.

For a trade of stock j, let the N×1 matrix $\delta$ be defined as:

$$\delta_i = 0 \text{ if } i \neq j$$

$$\delta_i = sP_j/F \text{ if } i = j$$

Thus, if the amounts of the various stocks (or other assets) in the portfolio before such a trade are represented as the N×1 matrix w, then the amounts of the various stocks in the portfolio after such a trade of stock j may be represented as the N×1 matrix $w+\delta$.

In an embodiment, for a potential trade of s shares of asset j, $s<0$ if the trade represents a sale of shares of asset j and $s>0$ represents a purchase of shares of asset j. Therefore, one acceptable cost formula for the portfolio after the trade of stock j (i.e., for the portfolio represented by $w+\delta$) is:

$$[(w+\delta-y)'V(w+\delta-y)](\tau/\rho) \quad \text{EQUATION \#2}$$

Thus the predicted change in tracking error cost of the portfolio due to a potential trade (or other transaction) 6 can be represented as the difference between the two costs:

cost after trade−cost before trade which can be represented as:

$$[(w+\delta-y)'V(w+\delta-y)](\tau/\rho) - [(w-y)'V(w-y)](\tau/\rho) \quad \text{EQUATION \#3}$$

which in turn can be manipulated mathematically and reduced to the equivalent representation:

$$[2\delta'V(w-y) + \delta'V\delta](\tau/\rho) \quad \text{EQUATION \#4}$$

Let $\lambda_j = [V(w-y)]_j$. In other words, $\lambda_j$ is the $j^{th}$ element of the N×1 vector [V (w−y)]. Let $\theta = V_{j,j}$. In other words, $\theta_j$ is the $j^{th}$ diagonal element of the N×N matrix V. The change in tracking error cost of the portfolio due to a potential trade of s shares at price $P_j$ per share can be expressed equivalently as:

$$[2\lambda_j(sP_j/F) + \theta_j(sP_j/F)^2](\tau/\rho) \quad \text{EQUATION \#5}$$

Note that the second term $[\theta_j (s P_j/F)^2]$ of Equation #5 above is non-negative, and thus in a trade where s is not zero, there is always a positive component to the change in tracking error cost of the portfolio due to a potential trade, though it is possible that the change in tracking error cost will be negative.

Equation #5 above calculates the change in tracking error cost in terms of return per time (e.g., annual return of the portfolio, daily return of the portfolio). To represent this cost to the portfolio in units of dollars (or yen or any other units), the return of Equation #5 is multiplied by the total value of the portfolio (e.g., F in units of dollars). In other words:

dollar cost of change resulting from the trade=$F$*
(change in return resulting from the trade)

which may be expressed as:

$$K=F[2\lambda_j(sP_j/F)+\theta_j(sP_j/F)^2](\tau/\rho) \qquad \text{EQUATION \#6}$$

Equation #6 above calculates the cost K that is induced by a potential trade of s shares in units of dollars (or yen or any other units). Note that the second term $[\theta_j (s P_j/F)^2]$ of Equation #6 above is non-negative, and thus in a trade where s is not zero, there is always a positive component to the cost K induced by a potential trade, though it is possible that K will be negative.

In an embodiment, to recover this cost K by a trade of s shares, K/s per share is to be recovered. Thus, the cost K may be recovered in a transaction of s shares by favorably changing (increasing or decreasing) the price of each share by K/s. Specifically, if the portfolio is selling, then K/s per share may be recovered by increasing the sale price of each share by K/s (since an increase in sale price is beneficial to the seller). Similarly, if the portfolio is buying, then K/s per share may be recovered by decreasing the purchase price of each share by K/s (since a decrease in purchase price is beneficial to the buyer). This change in the price of a share is referred to herein as a "reservation price increment" or RPI.

When s is negative (the portfolio is selling), an amount will be added to the share price (thereby making the sales price greater, which is better for the portfolio). Similarly, when s is positive (the portfolio is buying), an amount will be subtracted from the share price (thereby making the purchase price less, which is better for the portfolio). Thus, since new share price=old share price+RPI the reservation price increment may be represented (for a non-zero number of shares s) as:

RPI=−$K/s$ and thus new share price=old share price−$K/s$

The RPI formula is equivalent to

RPI=−$(F/s)[2\lambda_j(sP_j/F)+\theta_j(sP_j/F)^2](\tau/\rho)$ which is in turn equivalent to $$\text{RPI}=-(\tau/\rho)[2\lambda_j P_j+(\theta_j/F)sP_j^2] \qquad \text{EQUATION \#7}$$

Note that the RPI formula above is linear in the number of shares s. Thus, according to this embodiment, the amount by which a share price is changed in order to recover the ensuing cost (e.g., tracking error cost) of the potential trade depends on the number of shares in the trade, and generally increases as the number of shares increases.

For a positive cost K (e.g., the trade would increase tracking error), when s is negative (the portfolio is selling), an amount of reservation price increment will be added to the old share price (thereby making the sales price greater, which is better for the portfolio). Similarly, for a positive cost K, when s is positive (the portfolio is buying), an amount of reservation price increment will be subtracted from the old share price (thereby making the purchase price less, which is better for the portfolio).

The results of the disclosed calculations may be accomplished through a variety of alternative calculations that are mathematically equivalent to those described herein. For example, as is well known, a formula may be manipulated (e.g., algebraically) in any of a number of ways to yield one or more alternative but equivalent formulas.

Thus, one or more of the formulas described herein may be readily manipulated to yield equivalent formulas.

The reservation price increment may be used to determine a price at which a trade would be desirable to make (e.g., because the trade is made at a price which compensates for the certain costs imposed by the trade). Such a price at which a trade would be desirable to make is referred to herein as a "reservation price". For example, if the reservation price for a sale of one thousand shares of common stock of Microsoft Corporation is $50.00, then such a sale would be desirable if one thousand shares of common stock of Microsoft Corporation could be sold for $50.00 or more. Similarly, if the reservation price for a purchase of one thousand shares of common stock of Microsoft Corporation is $49.90, then such a purchase would be desirable if one thousand shares of common stock of Microsoft Corporation could be purchased for $49.90 or less.

In an embodiment, for a given asset (e.g., common stock of Microsoft Corporation) and for a given quantity of that asset (e.g., one thousand shares), there will be different reservation prices for a purchase and for a sale of that quantity of that asset. As in the example above involving common stock of Microsoft Corporation, for a given asset and quantity, the reservation price for a purchase is typically less than the reservation price for a sale.

In an embodiment, the RPI is a measure of the price per share that should be recovered to compensate for a cost (e.g., a cost of tracking error induced by the trade). Thus, the RPI can be combined with (e.g., added to) a price that represents a generally neutral transaction, such that there would be no aggregate monetary gain if the transaction were performed at that (neutral) price. Thus, by performing the transaction at a price more favorable than the "neutral" price, there would be monetary gain. According to such an embodiment, if the transaction price were more favorable than the neutral price by $1, then the aggregate monetary gain from the transaction could be considered to be $1.

In an embodiment, in calculating a reservation price for a trade of an asset, the RPI is combined with (e.g., added to) a price that represents the market value of that asset. For example, the RPI can be combined with a price that is derived from the prices of the inside market for that asset. In most markets, the prices of the inside market for an asset are the best bid price (i.e. the greatest of the bid prices) and the best offer price (the least of the bid prices) for that asset in a particular market. The best bid price and best offer price may be those best prices for a national or international market, those best prices for a particular market or exchange, those best prices for a particular market maker or set of market makers, or those best prices for any other group or subset.

One price that is derived from prices of the inside market is the "midpoint price". The midpoint price may be calculated as the average of the best bid price and the best offer price, or as that average rounded to a closest value (e.g., that average rounded to the closest $0.01). Alternatively, the midpoint price may be calculated as another function of the best bid price and the best offer price. In an embodiment, the midpoint price can be a weighted combination (e.g., a weighted average, a weighted linear combination) of the best bid price and the best offer price for an asset. For example, the midpoint price may be calculated as a sum of x*highest bid price+ y*lowest ask price, where x+y=1. In an embodiment, each of x and y is a real number that is in the range from zero to one (either inclusive or exclusive of zero and one).

In various situations, it can be desirable to use the midpoint as a representation of the market value of an asset. Accordingly, it can be desirable to add the RPI to the midpoint price (e.g., calculated as the average of the best bid price and the best offer price) to yield a reservation price.

In an embodiment, it can be desirable to add the RPI to another measure of "neutral value" to yield a reservation price. For example, the RPI may be combined with (e.g., added to) another price that is between the highest bid price and the lowest ask price for an instrument.

In an embodiment, the reservation price may be determined by adding or subtracting a predetermined value (or other value) to another price or another value (e.g., to any of the prices determined above, such as the midpoint price). For example, the reservation price may be calculated by adding a predetermined amount to or subtracting a predetermined amount from the midpoint price. In an embodiment, the predetermined amount (e.g., $0.01) is added to or subtracted from the midpoint price depending on whether the order is a buy order or a sell order, in order to increase the profit to the buyer or seller by one cent by either increasing the money received or decreasing the money paid for the trade. This increase in profit is measured relative to a hypothetical trade in which the buyer or seller merely traded at, e.g., the midpoint price.

In an embodiment, the determined RPI may be further modified in addition to the calculations described above. For example, in an embodiment, if s>0 (the portfolio is buying) and if the RPI is calculated (e.g., using Equation #7) to be greater than zero (and thus the reservation price for the purchase would be greater because a positive RPI would be added to the old price, e.g., the midpoint), then the RPI can be set to zero or to another predefined amount (e.g., a constant such as $0.01; a portion of the calculated RPI, such as 10% of the calculated RPI; a portion of an existing price, such as 1% of the midpoint price) or to a random amount (e.g., a random amount in a predefined range). The amount that the RPI is set to may be determined, e.g., in order to recover an amount such as a fee incurred in a trade. Setting the RPI to an amount less than the amount calculated, e.g., using Equation #7, can be advantageous in certain situations. For example, in situations in which it is believed that the purchase price without addition of the RPI (e.g., the midpoint price) is sufficient to elicit a counterparty to sell the asset at that price, the addition of the positive RPI (which raises the purchase price) would not be necessary to effect the purchase. Therefore, setting the RPI from a positive value to, e.g., zero, would save money by keeping the reservation price less than it otherwise would have been if the positive RPI were added.

As another example, if s<0 (the portfolio is selling) and if the RPI is calculated to be less than zero, then the RPI can be set to zero or to another predefined amount or a random amount. Setting the RPI to an amount greater than the amount calculated, e.g., using Equation #7, can be advantageous in certain situations. For example, in situations in which it is believed that the purchase price without addition of the RPI (e.g., the midpoint price) is sufficient to elicit a counterparty to buy the asset at that price, the addition of the negative RPI (which lowers the selling price) would not be necessary to effect the purchase. Therefore, setting the RPI from a negative value to, e.g., zero, would save money by keeping the reservation price greater than it otherwise would have been if the negative RPI were added.

In an embodiment, prices (e.g., real-time prices, delayed prices, historical prices) and other data that are employed in determining a reservation price may be received by a processor (e.g., received from a electronic data service via a network) and processed by the processor (e.g., a general purpose computer, another computing device) in accordance with the methods described herein.

Data such as bid prices, offer prices, trade prices, quantity, time of posting, and other data desirable to receive or process may be received in a variety of formats and from a variety of sources. For example, known and readily available data sources include level 1 data (e.g., Nasdaq level 1 data), level 2 data, Thomson Financial's Autex data services, Bloomberg data feeds, and IBM's Infodyne market data feeds.

Data sources involving certain indexes and other benchmarks are available known and readily available. For example, S & P 500 Index Alert service provides data for index replication, including index and constituent level information and corporate actions that affect the composition and value of the index.

An order embodying the reservation price, or embodying another price that is based on the reservation price, may be generated and provided, e.g., to a broker, to an electronic market, to an order management system, to any other recipient of an order. For example, an order defining an asset (e.g., common shares of Microsoft stock), a price (e.g., the calculated reservation price), a side (a buy order), and a quantity (e.g., 1000 shares) may be generated in any manner.

An order embodying the reservation price, or embodying another price that is based on the reservation price, may be of any of a variety of desirable types, and may be submitted, transmitted or otherwise provided in any desirable manner (e.g., via a electronic data network).

In an embodiment, for a particular quantity (e.g., 1000 shares) and a particular asset (e.g., common stock of Microsoft Corporation) both a buy order and a sell order are generated and provided to a market (e.g., via a connection to an electronic exchange, via a broker). The reservation price for the buy order would typically be different from the reservation price of the sell order. In an embodiment, if any one of such a buy order and sell order is accepted by a counterparty and thereby results in an actual purchase or sale of the asset, the other one of the buy order and sell order is canceled. The actual purchase or sale of the asset changes the value w, accordingly since the percentage of the portfolio that the $i^{th}$ asset represents has changed due to the purchase or sale.

In an embodiment, after the actual purchase or sale, the other (unaccepted) order can have its price changed (to represent the calculation of a new reservation price based on the new $w_i$ that results from the actual purchase or sale), or a new order with the new price (e.g., reservation price recalculated for the new $w_i$) can be generated. For example, after an actual purchase, $w_i$ changes, and the price of a sell order can be set based on the reservation price calculated based on the new $w_i$.

In an embodiment, after the actual purchase or sale, a new buy order and a new sell order are generated, each having its respective price based on a new reservation price that is based on the new $w_i$ that results from the actual purchase or sale. For example, after an actual purchase, $w_i$ changes, and the price of a buy order and the price of a sell order can each be set based on the respective reservation prices calculated based on the new $w_i$.

In an embodiment, for a plurality of particular quantities (e.g., for 1000 shares, 2000 shares and 3000 shares) and a particular asset (e.g., common stock of Microsoft Corporation) both a buy order and a sell order for each quantity are generated and provided to a market (e.g., via a connection to an electronic exchange, via a broker). For a particular quantity, the reservation price for the buy order would typically be different from the reservation price of the sell order. In an embodiment, if any one of such buy orders and sell orders is accepted by a counterparty and thereby results in an actual purchase or sale of the asset at some quantity, the other buy orders and sell orders are canceled. The actual purchase or sale of the asset changes the value w, accordingly since the percentage of the portfolio that the $i^{th}$ asset represents has changed due to the purchase or sale.

In an embodiment, after such an actual purchase or sale, the other (unaccepted) orders can have their respective prices changed (to represent the calculation of a new reservation price based on the new $w_i$ that results from the actual purchase or sale), or a plurality of new orders with respective new prices (e.g., reservation price recalculated for the new $w_i$) can be generated. For example, after an actual purchase, $w_i$ changes, and the prices of the other buy orders and sell orders can be set based on the reservation price calculated based on the new $w_i$ and respective quantities.

In an embodiment, after the actual purchase or sale, a new plurality of pairs of buy orders and sell orders is generated, each order having its respective price based on a new reservation price that is based on the new $w_i$ that results from the actual purchase or sale. For example, after an actual purchase, $w_i$ changes, and the price of each buy order and the price of each sell order can be set based on the respective reservation prices calculated based on the new $w_i$ and respective quantities.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for permitting a market maker to generate a buy order and a sell order, the method comprising:
   calculating, by at least one processor, a market price of a predetermined financial instrument based on at least one price for the financial instrument;
   determining, by the at least one processor, a sale reservation price increment for a sale of a predetermined quantity of the financial instrument,
      wherein the sale reservation price increment is calculated based on a predicted change in tracking error of a portfolio that would result from selling the predetermined quantity of the financial instrument;
   calculating, by the at least one processor, a sale reservation price by adding the sale reservation price increment to the market price;
   determining, by the at least one processor, a buy reservation price increment for a purchase of the predetermined quantity of the financial instrument,
      wherein the buy reservation price increment is calculated based on a predicted change in tracking error of the portfolio that would result from purchasing the predetermined quantity of the financial instrument;
   calculating, by the at least one processor, a buy reservation price by adding the buy reservation price increment to the market price;
   generating, by the at least one processor, a sell order for the financial instrument at the sale reservation price for the predetermined quantity;
   generating, by the at least one processor, a buy order for the financial instrument at the buy reservation price for the predetermined quantity; and
   posting, by the at least one processor, the buy order and the sell order to an electronic marketplace.

2. The method of claim 1,
   in which the predicted change in tracking error that would result from selling the predetermined quantity of the financial instrument comprises a measure of how much the portfolio would deviate from a benchmark if the portfolio sold the predetermined quantity of the financial instrument,
   in which the predicted change in tracking error that would result from purchasing the predetermined quantity of the financial instrument comprises a measure of how much the portfolio would deviate from a benchmark if the portfolio purchased the predetermined quantity of the financial instrument,
   in which the act of calculating the market price comprises determining a first price between a best bid price and a best offer price for the financial instrument, and
   in which determining the first price for the financial instrument comprises:
      determining the best bid price and the best offer price from market data received from a data service; and
      setting the first price to a price between the best bid price and the best offer price.

3. The method of claim 2, in which the benchmark comprises an index.

4. The method of claim 2, in which the act of setting the first price to a price between the best bid price and the best offer price comprises setting the first price to an average of the best bid price and the best offer price.

5. The method of claim 1, in which the portfolio is designed to engage in trading activity such that a financial performance of the portfolio stays within a predetermined deviation metric of a financial performance of a benchmark index over a predetermined period of time.

6. The method of claim 5, in which the benchmark index comprises a stock index fund.

7. The method of claim 1,
   in which the predicted change in tracking error of the portfolio that would result from selling the predetermined quantity of the financial instrument is greater than the predicted change in tracking error of the portfolio that would result from purchasing the predetermined quantity of the financial instrument, and
   in which an absolute value of a difference between the sale reservation price and a best offer price for the financial instrument is greater than an absolute value of a difference between the buy reservation price and a best bid price for the financial instrument.

8. The method of claim 1, further comprising:
   receiving a confirmation of an executed trade against one of the buy order and sell order.

9. The method of claim 1, in which the act of calculating a market price of the predetermined financial instrument comprises calculating a market price of the predetermined financial instrument by determining a midpoint between a best bid price and a best offer price for the financial instrument.

10. A method for permitting a market maker to generate a plurality of buy orders and sell orders, the method comprising:

calculating, by at least one processor, a market price of a predetermined financial instrument based on at least one price for the financial instrument;

determining, by at least one processor, for each of a plurality of quantities, a sale reservation price increment for a sale of the respective quantity of the financial instrument,
- wherein each sale reservation price increment is calculated based on a predicted change in tracking error of a portfolio that would result from selling the respective quantity of the financial instrument;

calculating, by the at least one processor, for each of a plurality of quantities, a respective sale reservation price by adding the sale reservation price increment for the respective quantity to the market price;

determining, by the at least one processor, for each of the plurality of quantities, a buy reservation price increment for a purchase of the respective quantity of the financial instrument,
- wherein each buy reservation price increment is calculated based on a predicted change in tracking error of the portfolio that would result from purchasing the respective quantity of the financial instrument;

calculating, by the at least one processor, for each of the plurality of quantities, a respective buy reservation price by adding the buy reservation price increment for the respective quantity to the market price;

generating, by the at least one processor, for each of the plurality of quantities, a sell order for the financial instrument at the respective sale reservation price for the respective quantity;

generating, by the at least one processor, for each of the plurality of quantities, a buy order for the financial instrument at the respective buy reservation price for the respective quantity; and posting, by the at least one processor, the buy orders and the sell orders to an electronic marketplace.

11. The method of claim 10, further comprising:
receiving a confirmation of an executed trade against one of (1) one of the buy orders and (2) one of the sell orders.

12. The method of claim 10, in which the act of calculating a market price of the predetermined financial instrument comprises calculating a market price of the predetermined financial instrument by determining a midpoint between a best bid price and a best offer price for the financial instrument.

13. The method of claim 10, in which the portfolio is designed to engage in trading activity such that a financial performance of the portfolio stays within a predetermined deviation metric of a financial performance of a benchmark index over a predetermined period of time.

14. The method of claim 10,
in which the predicted change in tracking error of the portfolio that would result from selling a particular quantity of the financial instrument is greater than the predicted change in tracking error of the portfolio that would result from purchasing the particular quantity of the financial instrument, and
in which an absolute value of a difference between the sale reservation price and a best offer price for the financial instrument is greater than an absolute value of a difference between the buy reservation price and a best bid price for the financial instrument.

15. The method of claim 14, in which the benchmark index comprises a stock index fund.

16. A non-transitory computer-readable storage medium having instructions stored thereon which are configured to direct at least one processor to perform the following actions:
calculate a market price of a predetermined financial instrument by determining a first price between a best bid price and a best offer price for the financial instrument;

determine, for each of a plurality of quantities, a sale reservation price increment for a sale of the respective quantity of the financial instrument,
wherein each sale reservation price increment is calculated based on a predicted change in tracking error of a portfolio that would result from selling the respective quantity of the financial instrument;

calculate, for each of a plurality of quantities, a respective sale reservation price by adding the sale reservation price increment for the respective quantity to the market price;

determine, for each of the plurality of quantities, a buy reservation price increment for a purchase of the respective quantity of the financial instrument,
wherein each buy reservation price increment is calculated based on a predicted change in tracking error of the portfolio that would result from purchase the respective quantity of the financial instrument;

calculating, for each of the plurality of quantities, a respective buy reservation price by adding the buy reservation price increment for the respective quantity to the market price;

generate, for each of the plurality of quantities, a sell order for the financial instrument at the respective sale reservation price for the respective quantity;

generate, for each of the plurality of quantities, a buy order for the financial instrument at the respective buy reservation price for the respective quantity; and post the buy orders and the sell orders to an electronic marketplace.

17. The storage medium of claim 16, in which the instructions are further configured to direct the at least one processor to:
receive a confirmation of an executed trade against one of (1) one of the buy orders and (2) one of the sell orders.

18. The storage medium of claim 16,
in which the predicted change in tracking error that would result from selling the predetermined quantity of the financial instrument comprises a measure of how much the portfolio would deviate from a benchmark if the portfolio sold the predetermined quantity of the financial instrument,
in which the predicted change in tracking error that would result from purchasing the predetermined quantity of the financial instrument comprises a measure of how much the portfolio would deviate from a benchmark if the portfolio purchased the predetermined quantity of the financial instrument, and
in which the benchmark comprises an index.

19. The storage medium of claim 16, in which the portfolio is designed to engage in trading activity such that a financial performance of the portfolio stays within a predetermined deviation metric of a financial performance of a benchmark index over a predetermined period of time.

20. The storage medium of claim 19, in which the benchmark index comprises a stock index fund.

21. The storage medium of claim 16,
in which the predicted change in tracking error of the portfolio that would result from selling the predetermined quantity of the financial instrument is greater than the predicted change in tracking error of the portfolio that would result from purchasing the predetermined quantity of the financial instrument, and in which an absolute value of a difference between the sale reservation price and a best offer price for the financial instrument is greater than an absolute value of a difference between the buy reservation price and a best bid price for the financial instrument.

22. The storage medium of claim 16, in which the act of calculating a market price of the predetermined financial instrument comprises calculating a market price of the predetermined financial instrument by determining a midpoint between a best bid price and a best offer price for the financial instrument.

23. The storage medium of claim 16, in which the act of calculating a market price of the predetermined financial instrument comprises:

computing an average of the best bid price and the best offer price.

24. An apparatus for permitting a market maker to generate a buy order and a sell order, comprising:

at least one processor; and a memory operatively coupled to the at least one processor that stores instructions which, when executed by the at least one processor, direct the at least one processor to:

calculate a market price of a predetermined financial instrument based on at least one price for the financial instrument;

determine a sale reservation price increment for a sale of a predetermined quantity of the financial instrument, wherein the sale reservation price increment is calculated based on a predicted change in tracking error of a portfolio that would result from selling the predetermined quantity of the financial instrument;

calculate a sale reservation price by adding the sale reservation price increment to the market price;

determine a buy reservation price increment for a purchase of the predetermined quantity of the financial instrument, wherein the buy reservation price increment is calculated based on a predicted change in tracking error of the portfolio that would result from purchasing the predetermined quantity of the financial instrument;

calculate a buy reservation price by adding the buy reservation price increment to the market price;

generate a sell order for the financial instrument at the sale reservation price for the predetermined quantity;

generate a buy order for the financial instrument at the buy reservation price for the predetermined quantity; and post the buy order and the sell order to an electronic marketplace.

25. The apparatus of claim 24, in which the predicted change in tracking error that would result from selling the predetermined quantity of the financial instrument comprises a measure of how much the portfolio would deviate from a benchmark if the portfolio sold the predetermined quantity of the financial instrument, in which the predicted change in tracking error that would result from purchasing the predetermined quantity of the financial instrument comprises a measure of how much the portfolio would deviate from a benchmark if the portfolio purchased the predetermined quantity of the financial instrument, in which the act of calculating the market price comprises determining a first price between a best bid price and a best offer price for the financial instrument, and in which determining the first price for the financial instrument comprises:

determining the best bid price and the best offer price from market data received from a data service; and setting the first price to a price between the best bid price and the best offer price.

26. The apparatus of claim 25, in which the benchmark comprises an index.

27. The apparatus of claim 25, in which the act of setting the first price to a price between the best bid price and the best offer price comprises setting the first price to an average of the best bid price and the best offer price.

28. The apparatus of claim 24, in which the portfolio is designed to engage in trading activity such that a financial performance of the portfolio stays within a predetermined deviation metric of a financial performance of a benchmark index over a predetermined period of time.

29. The apparatus of claim 28, in which the benchmark index comprises a stock index fund.

30. The apparatus of claim 24, in which the predicted change in tracking error of the portfolio that would result from selling the predetermined quantity of the financial instrument is greater than the predicted change in tracking error of the portfolio that would result from purchasing the predetermined quantity of the financial instrument, and in which an absolute value of a difference between the sale reservation price and a best offer price for the financial instrument is greater than an absolute value of a difference between the buy reservation price and a best bid price for the financial instrument.

31. The apparatus of claim 24, in which the instructions, when executed by the at least one processor, further direct the at least one processor to: receive a confirmation of an executed trade against one of the buy order and sell order.

32. The apparatus of claim 24, in which the act of calculating a market price of the predetermined financial instrument comprises calculating a market price of the predetermined financial instrument by determining a midpoint between a best bid price and a best offer price for the financial instrument.

33. An apparatus for permitting a market maker to generate a plurality of buy orders and sell orders, comprising:

at least one processor;

at least one memory having instructions stored thereon which, when executed by the at least one processor, direct the at least one processor to:

calculate a market price of a predetermined financial instrument based on at least one price for the financial instrument;

determine, for each of a plurality of quantities, a sale reservation price increment for a sale of the respective quantity of the financial instrument, wherein each sale reservation price increment is calculated based on a predicted change in tracking error of a portfolio that would result from selling the respective quantity of the financial instrument;

calculate, for each of a plurality of quantities, a respective sale reservation price by adding the sale reservation price increment for the respective quantity to the market price;

determine, for each of the plurality of quantities, a buy reservation price increment for a purchase of the respective quantity of the financial instrument, wherein each buy reservation price increment is calculated based on a predicted change in tracking error of the portfolio that would result from purchasing the respective quantity of the financial instrument;

calculate, for each of the plurality of quantities, a respective buy reservation price by adding the buy reservation price increment for the respective quantity to the market price;

generate, for each of the plurality of quantities, a sell order for the financial instrument at the respective sale reservation price for the respective quantity;

generate, for each of the plurality of quantities, a buy order for the financial instrument at the respective buy reservation price for the respective quantity; and post the buy orders and the sell orders to an electronic marketplace.

34. The apparatus of claim 33, in which the instructions, when executed by the at least one processor, further direct the at least one processor to:

receive a confirmation of an executed trade against one of (1) one of the buy orders and (2) one of the sell orders.

35. The apparatus of claim 33, in which the act of calculating a market price of the predetermined financial instrument comprises calculating a market price of the predetermined financial instrument by determining a midpoint between a best bid price and a best offer price for the financial instrument.

36. The apparatus of claim 33, in which the portfolio is designed to engage in trading activity such that a financial performance of the portfolio stays within a predetermined deviation metric of a financial performance of a benchmark index over a predetermined period of time.

37. The apparatus of claim 33, in which the predicted change in tracking error of the portfolio that would result from selling a particular quantity of the financial instrument is greater than the predicted change in tracking error of the portfolio that would result from purchasing the particular quantity of the financial instrument, and in which an absolute value of a difference between the sale reservation price and a best offer price for the financial instrument is greater than an absolute value of a difference between the buy reservation price and a best bid price for the financial instrument.

38. The apparatus of claim 37, in which the benchmark index comprises a stock index fund.

39. A non-transitory computer-readable storage medium having instructions stored thereon which are configured to direct at least one processor to perform the following actions:

calculate a market price of a predetermined financial instrument based on at least one price for the financial instrument;

determine a sale reservation price increment for a sale of a predetermined quantity of the financial instrument, wherein the sale reservation price increment is calculated based on a predicted change in tracking error of a portfolio that would result from selling the predetermined quantity of the financial instrument;

calculate a sale reservation price by adding the sale reservation price increment to the market price;

determine a buy reservation price increment for a purchase of the predetermined quantity of the financial instrument, wherein the buy reservation price increment is calculated based on a predicted change in tracking error of the portfolio that would result from purchasing the predetermined quantity of the financial instrument;

calculate a buy reservation price by adding the buy reservation price increment to the market price;

generate a sell order for the financial instrument at the sale reservation price for the predetermined quantity;

generate a buy order for the financial instrument at the buy reservation price for the predetermined quantity; and post the buy order and the sell order to an electronic marketplace.

40. The storage medium of claim 39, in which the predicted change in tracking error that would result from selling the predetermined quantity of the financial instrument comprises a measure of how much the portfolio would deviate from a benchmark if the portfolio sold the predetermined quantity of the financial instrument, in which the predicted change in tracking error that would result from purchasing the predetermined quantity of the financial instrument comprises a measure of how much the portfolio would deviate from a benchmark if the portfolio purchased the predetermined quantity of the financial instrument, in which the act of calculating the market price comprises determining a first price between a best bid price and a best offer price for the financial instrument, and in which determining the first price for the financial instrument comprises:

determining the best bid price and the best offer price from market data received from a data service; and setting the first price to a price between the best bid price and the best offer price.

41. The storage medium of claim 40, in which the benchmark comprises an index.

42. The storage medium of claim 40, in which the act of setting the first price to a price between the best bid price and the best offer price comprises setting the first price to an average of the best bid price and the best offer price.

43. The storage medium of claim 39, in which the portfolio is designed to engage in trading activity such that a financial performance of the portfolio stays within a predetermined deviation metric of a financial performance of a benchmark index over a predetermined period of time.

44. The storage medium of claim 43, in which the benchmark index comprises a stock index fund.

45. The storage medium of claim 39, in which the predicted change in tracking error of the portfolio that would result from selling the predetermined quantity of the financial instrument is greater than the predicted change in tracking error of the portfolio that would result from purchasing the predetermined quantity of the financial instrument, and in which an absolute value of a difference between the sale reservation price and a best offer price for the financial instrument is greater than an absolute value of a difference between the buy reservation price and a best bid price for the financial instrument.

46. The storage medium of claim 39, in which the instructions are further configured to direct the at least one processor to:

receive a confirmation of an executed trade against one of the buy order and sell order.

47. The storage medium of claim 39, in which the act of calculating a market price of the predetermined financial instrument comprises calculating a market price of the predetermined financial instrument by determining a midpoint between a best bid price and a best offer price for the financial instrument.

\* \* \* \* \*